United States Patent [19]

Osawa

[11] Patent Number: 5,617,483
[45] Date of Patent: Apr. 1, 1997

[54] PATTERN LEARNING METHOD

[75] Inventor: Akira Osawa, Kanagawa-ken, Japan

[73] Assignee: Fuji Photo Film Co., Ltd., Kanagawa, Japan

[21] Appl. No.: 339,883

[22] Filed: Nov. 14, 1994

Related U.S. Application Data

[63] Continuation of Ser. No. 12,779, Feb. 3, 1993, abandoned.

[30] Foreign Application Priority Data

Feb. 4, 1992 [JP] Japan .................................. 4-018864
Dec. 25, 1992 [JP] Japan .................................. 4-347237

[51] Int. Cl.$^6$ ..................................................... G06K 9/62
[52] U.S. Cl. ............................................. 382/159; 395/23
[58] Field of Search .................................... 382/155, 156, 382/158, 159, 194; 395/23, 24, 25, 26, 27

[56] References Cited

U.S. PATENT DOCUMENTS

| | | | |
|---|---|---|---|
| 5,048,100 | 9/1991 | Kuperstein | 382/15 |
| 5,111,516 | 5/1992 | Nakano et al. | 382/25 |
| 5,214,717 | 5/1993 | Kimura et al. | 382/158 |
| 5,239,594 | 8/1993 | Yoda | 382/158 |
| 5,311,601 | 5/1994 | Carpenter | 382/158 |
| 5,323,471 | 6/1994 | Hayashi | 382/159 |

OTHER PUBLICATIONS

Kim et al. "Global Placement of Macro Cells Using Self-Organization Principle" IEEE Int. Symp. Circ. and Sys. vol. 5, pp. 3122–3125 Jun. 1991.

"Gazo Kaiseki Handbook" (Image Analysis Handbook) by Takagi and Shimoda pp. 172–205.

"Self-Organizing Optical Neural Network for Unsupervised Learning" by Taiwei Lu, Optical Engineering, vol. 29, No. 9, 1990.

"Identification of JIS First and Second Level Printed Characters by Comb NET" by Toma et al., The Institute of Electronics and Communication Engineers of Japan, 1990.

(List continued on next page.)

*Primary Examiner*—Joseph Mancuso
*Assistant Examiner*—Jayanti K. Patel
*Attorney, Agent, or Firm*—Sughrue, Mion, Zinn, Macpeak & Seas

[57] ABSTRACT

In a pattern learning method, each of pieces of information representing a plurality of different fundamental patterns is presented to a large number of cells of a neural network, and the cells are thereby caused to learn a large number of feature patterns. The method comprises the steps of causing a cell, which best matches with a fundamental pattern having been presented to the neural network, to learn the fundamental pattern. For neighboring cells that fall within a neighboring region having a predetermined range and neighboring with the cell, which best matches with the fundamental pattern having been presented to the neural network, spatial interpolating operations are carried out from the fundamental pattern, which has been presented to the neural network, and a fundamental pattern, which is other than the fundamental pattern having been presented to the neural network and which has been learned by a cell that is among the large number of the cells of the neural network and that is other than the cell best matching with the fundamental pattern having been presented to the neural network. The neighboring cells are caused to learn the results of the spatial interpolating operations.

39 Claims, 14 Drawing Sheets

OTHER PUBLICATIONS

"The Self–Organizing Map" by T. Kohonen, Proceeding of the IEEE, vol. 78, No. 9, 1990.

"Self–Organization and Associative Memory" by T. Kohonen, Springer–Verlag, 1984.

IEEE Proceedings of the International Joint Conference on Neural Networks, Cat. No. 91CH3049–4, vol. 2, 14 Jul. 1991, Seattle, WA, USA pp. 201–206, LO Z.P., Bavarian B. 'Improved Rate of Convergence in Kohonen Neural Network' Definition 1 on p. 201, Definition 2 on page 202.

Optical Engineering, vol. 29, No. 9, Sep. 1990, Bellingham US, pp. 1107–1113, Taiwei Lu et al. 'Self–Organizing Optical Neural Network for Unsupervised Learing'.

IEEE Proceedings of the 10th International Conference on Pattern Recognition, Cat. No. 90CH2898–5, vol. 1, 21 Jun. 1990, Atlantic City, NJ, USA, pp. 738–740, Kerin M. A., Stonhan T.J. 'Face Recognition Using a Digital Neural Network with Self–Organizing Capabilities'.

Proceedings of the IEEE, vol. 78, No. 9, Sep, 1990, USA, pp. 1464–1480, Kohonen T., 'The Self–Organizing Map'.

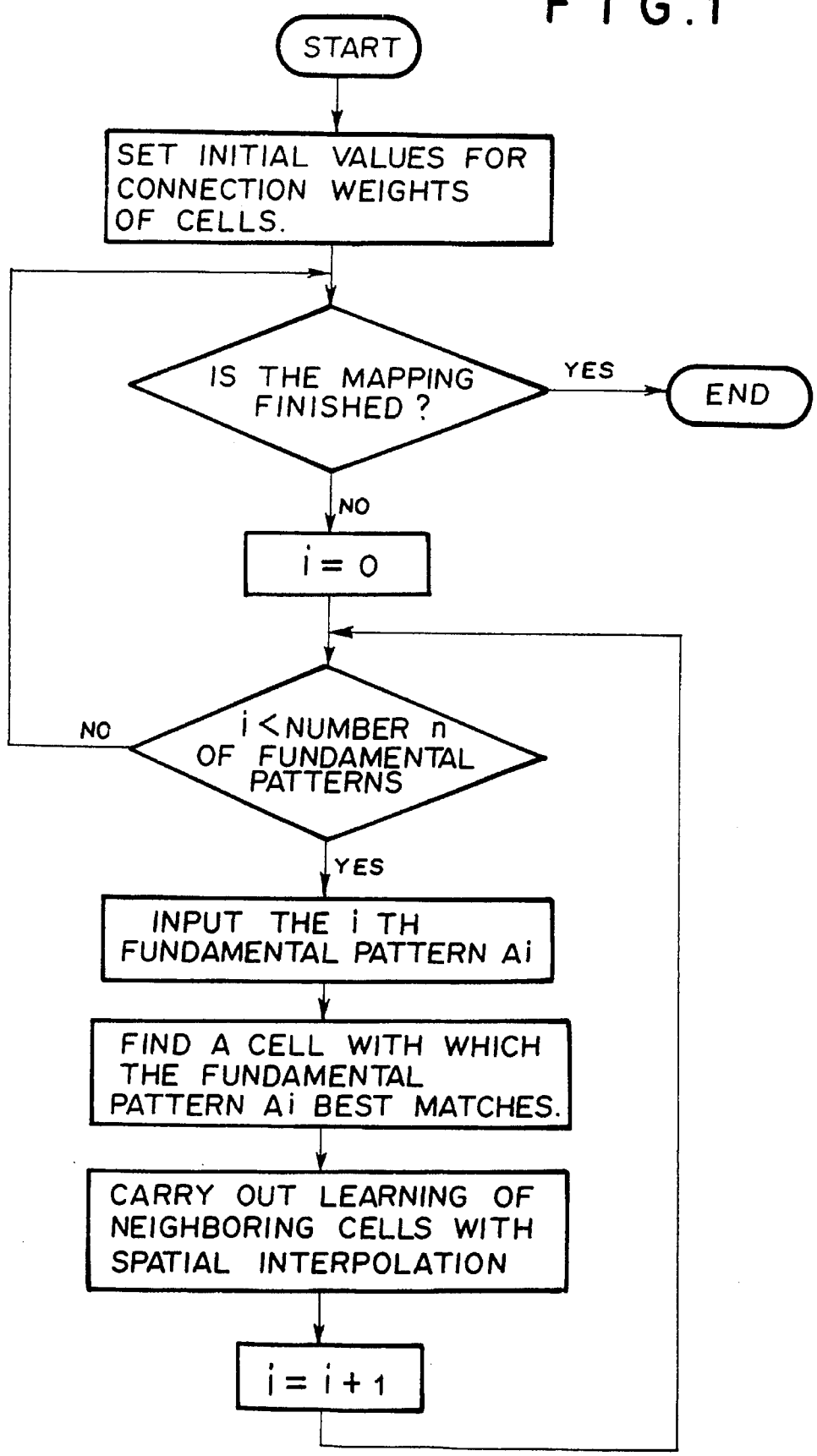
F I G. 1

PATTERN LEARNING METHOD

This is a continuation of application Ser. No. 08/012,779 filed Feb. 3, 1993, now abandoned.

BACKGROUND OF THE INVENTION

1. Field of the Invention

This invention relates to a pattern learning method for a neural network. This invention particularly relates to a pattern learning method, wherein a large number of cells of a neural network are caused to learn a large number of feature patterns.

2. Description of the Prior Art

Matching techniques have heretofore been used widely in the field of pattern recognition in image processing. One of typical matching techniques is to accumulate image pattern models (i.e., templates), which have been selected manually, as a knowledge and to carry out discrimination of a target object by template matching. However, as described in, for example, "Gazo Kaiseki Handbook" (Image Analysis Handbook) by Takagi and Shimoda, pp. 172–205, 1991, Publishing Group of the University of Tokyo, the template matching technique has various drawbacks in that, for example, models of discrimination target objects are fixed, and therefore the technique cannot cope with a wide variety of changes in the target objects (such as changes in sizes, directions, and shapes of the target objects). Also, because ordering of image patterns is not effected, if the number of models of image patterns becomes large, it is difficult to ascertain whether or not a pattern necessary for discrimination of a target object is missing.

Recently, in order to solve the problems described above, a technique utilizing a neural network, which simulates the principle of information processing carried out by a brain of a human being, has been proposed. The technique utilizing a neural network aims at carrying out the learning of models of image patterns accumulated as templates by use of a learning model of the neural network and utilizing the results of the learning operation during the discrimination of a target object. Specifically, with the technique utilizing a neural network, an attempt is made to impart the flexible characteristics of the neural network to the templates at the learning stage such that the templates can cope with a wide variety of changes in target objects.

By way of example, the learning models include Kohonen's self-organized mapping, which is described in, for example, "Self-Organization and Associative Memory" by T. Kohonen, Springer-Verlag, 1984. The Kohonen's self-organized mapping model learns topological mapping through self-organization. The topological mapping means that, for example, a signal which a human being has received from the outer world, i.e., a signal representing a certain pattern, is allocated to a neuron on the cortex in accordance with a certain kind of rule reflecting the order of the pattern.

The learning of binary images utilizing the Kohonen's self-organization has been reported in, for example, "Self-Organizing Optical Neural Network for Unsupervised Learning" by Taiwei Lu, etc., Optical Engineering, Vol. 29, No. 9, 1990. Also, utilization of the Kohonen's self-organization in rough classification pre-processing during character recognition has been reported in, for example, "Identification of JIS First and Second Level Printed Characters by Comb NET" by Toma, Iwata, et al., Nagoya Kogyo University, Autumn Collected Drafts of The Institute of Electronics and Communication Engineers of Japan, 1990.

Additionally, an attempt has been made to carry out the learning of voices by a learning vector quantization technique (LVQ), which is an advanced self-organization technique, and to discriminate voices. Such an attempt is described in, for example, "The Self-Organization Map" by T. Kohonen, Proceedings of The IEEE, Vol. 78, No. 9, 1990, 9. With this attempt, vector quantization is carried out with the self-organized mapping, and voices are thereby recognized.

However, the aforesaid techniques utilizing neural networks, such as the Kohonen's self-organization, are applied only to character patterns and simple binary images. It is difficult for such techniques to be applied to complicated gray level images, and no attempt has heretofore been made to apply such techniques to complicated gray level images.

By way of example, problems encountered when the target object to be discriminated is a human face will be described hereinbelow. As described above, with the Kohonen's self-organized mapping, a certain pattern can be learned in accordance with a certain kind of rule reflecting the order of the pattern. However, when a learning operation is carried out by using a closed human eye pattern 40 and an open eye pattern 41, which are shown in FIG. 24, as the patterns, the results of the learning operation shown in FIG. 25 are obtained. Specifically, cells located between the cells, to which the closed eye pattern 40 has been allocated, and the cells, to which the open eye pattern 41 has been allocated, learn an eye pattern 42 which results from the superposition of the closed eye pattern 40 and the open eye pattern 41. Therefore, with the superposition learning operation, it is difficult to utilize the results of the learning operation during the discrimination of a target object, and the learning operation cannot be carried out efficiently. If the feature patterns of all faces present in the world could be learned, it would be possible to carry out the discrimination of faces appropriately. However, actually, it will be impossible to learn the feature patterns of all faces present in the world.

Therefore, a need exists for an efficient learning method, with which the information representing the feature patterns of typical faces is supplied and intermediate patterns between these feature patterns can be learned from the information. Such an efficient learning method will enable discrimination (generalization) of images other than the supplied feature patterns, i.e. images which have not been learned. Specifically, templates can be imparted with flexibility such that they can cope with a wide variety of changes in target objects.

SUMMARY OF THE INVENTION

The primary object of the present invention is to provide a pattern learning method, wherein a Kohonen's self-organization, which is one of techniques for a neural network, is improved, and the improved Kohonen's self-organization is utilized such that, when information representing typical feature patterns is presented to the neural network, the neural network can learn patterns, which are intermediate between the typical feature patterns, while the topological relationship is being kept, and the learning operation of the neural network can thereby be carried out efficiently.

Another object of the present invention is to provide a pattern learning method, with which a neural network can learn gray level images, such as feature patterns of faces.

The present invention provides a first pattern learning method, wherein each of pieces of information representing a plurality of different fundamental patterns is presented to a large number of cells of a neural network, and the cells are thereby caused to learn a large number of feature patterns, the pattern learning method comprising the steps of:

i) causing a cell, which best matches with a fundamental pattern having been presented to the neural network, to learn the fundamental pattern, ii) for neighboring cells that fall within a neighboring region having a predetermined range and neighboring with the cell, which best matches with the fundamental pattern having been presented to the neural network, carrying out spatial interpolating operations from the fundamental pattern, which has been presented to the neural network, and a fundamental pattern, which is other than the fundamental pattern having been presented to the neural network and which has been learned by a cell that is among the large number of the cells of the neural network and that is other than the cell best matching with the fundamental pattern having been presented to the neural network, and iii) causing the neighboring cells to learn the results of the spatial interpolating operations.

The present invention also provides a second pattern learning method, wherein each of pieces of information representing a plurality of different fundamental patterns is presented to a large number of cells of a neural network, and the cells are thereby caused to learn a large number of feature patterns, the pattern learning method comprising the steps of:

i) presenting information representing a single fundamental pattern, which is among the plurality of the fundamental patterns, to the neural network having predetermined values as initial values of weights of connections of the large number of the cells, ii) for each of neighboring cells that fall within a neighboring region having a predetermined range and having its center at a cell, which best matches with the fundamental pattern having been presented to the neural network, selecting fundamental patterns, which best match with cells falling within a region that has its center at the neighboring cell and that has a range larger than the range of the neighboring region, carrying out spatial interpolating operations from the respective fundamental patterns in accordance with the relationship between each of the positions of the cells, with which the selected fundamental patterns best match, and the position of the neighboring cell, thereafter carrying out the learning of the weight of connection of the neighboring cell in accordance with interpolated patterns, which have been obtained from the spatial interpolating operations, iii) carrying out the learning for all of the plurality of the fundamental patterns, and iv) iterating the learning for all of the plurality of the fundamental patterns until the large number of the cells finish their learning operations.

The present invention additionally provides a third pattern learning method, wherein the aforesaid second pattern learning method in accordance with the present invention is modified such that, of the selected fundamental patterns, which best match with the cells falling within the region that has its center at the neighboring cell and that has a range larger than the range of the neighboring region, a selected fundamental pattern is not used during the spatial interpolating operations which best matches with the same cell as the cell best matching with the fundamental pattern having been presented to the neural network and which is different from the fundamental pattern having been presented to the neural network.

The present invention further provides a fourth pattern learning method, wherein the aforesaid second or third pattern learning method in accordance with the present invention is modified such that, in the neural network, results of the learning with a Kohonen's self-organization with respect to the plurality of the fundamental patterns or results obtained from manual presentation of the plurality of the fundamental patterns are utilized as the initial values of the weights of connections of the large number of the cells.

The present invention still further provides a fifth pattern learning method, wherein the aforesaid second, third, or fourth pattern learning method in accordance with the present invention is modified such that information representing a plurality of feature points, which are common to the plurality of the fundamental patterns, and information representing density values of respective picture elements in each of the fundamental patterns are presented to the neural network for each of the fundamental patterns, and the learning of the weight of connection of the neighboring cell is carried out in accordance with interpolated patterns, which have been obtained from spatial interpolating operations with respect to the feature points and the density values.

The present invention also provides a sixth pattern learning method, wherein the aforesaid second, third, or fourth pattern learning method in accordance with the present invention is modified such that information representing a plurality of feature points, which are common to the plurality of the fundamental patterns, is presented to the neural network for each of the fundamental patterns, and the learning of the weight of connection of the neighboring cell is carried out in accordance with interpolated patterns, which have been obtained from spatial interpolating operations with respect to the feature points.

The present invention additionally provides a seventh pattern learning method, wherein the aforesaid sixth pattern learning method in accordance with the present invention is modified such that, after the learning for all of the plurality of the fundamental patterns has been iterated until the large number of the cells finish their learning operations, density values of respective picture elements in each of the interpolated patterns are spatially interpolated and allocated to the large number of the cells in accordance with the results of the learning.

With the first pattern learning method in accordance with the present invention, each of pieces of information representing a plurality of different fundamental patterns is presented to a large number of cells of a neural network, and the cells are thereby caused to learn a large number of feature patterns. The first pattern learning method comprises the steps of causing a cell, which best matches with a fundamental pattern having been presented to the neural network, to learn the fundamental pattern. Thereafter, for neighboring cells that fall within a neighboring region having a predetermined range and neighboring with the cell, which best matches with the fundamental pattern having been presented to the neural network, spatial interpolating operations are carried out from the fundamental pattern, which has been presented to the neural network, and a fundamental pattern, which is other khan the fundamental pattern having been presented to the neural network and which has been learned by a cell that is other than the cell best matching with the fundamental pattern having been presented to the neural network. The neighboring cells are then caused to learn the results of the spatial interpolating operations.

Also, with the second pattern learning method in accordance with the present invention, each of pieces of information representing a plurality of different fundamental patterns is presented to a large number of cells of a neural network, and the cells are thereby caused to learn a large number of feature patterns. The second pattern learning method comprises the steps of presenting information representing a single fundamental pattern, which is among the plurality of the fundamental patterns, to the neural network having random values as initial values of weights of connections of the large number of the cells. Thereafter, for each of neighboring cells that fall within a neighboring region having a predetermined range and having its center at a cell, which best matches with the fundamental pattern having been presented to the neural network, fundamental patterns are selected which best match with cells falling within a region that has its center at the neighboring cell and that has a range larger than the range of the neighboring region. Spatial interpolating operations are then carried out from the respective fundamental patterns in accordance with the relationship between each of the positions of the cells, with which the selected fundamental patterns best match, and the position of the neighboring cell. Thereafter, the learning of the weight of connection of the neighboring cell is carried out in accordance with interpolated patterns, which have been obtained from the spatial interpolating operations.

Thereafter, the learning is carried out for all of the plurality of the fundamental patterns. The learning for all of the plurality of the fundamental patterns is iterated until the large number of the cells of the neural network finish their learning operations.

As described above, with the first and second pattern learning methods in accordance with the present invention, the learning operations are carried out with the spatial interpolating operations. Therefore, the neural network can learn patterns, which are intermediate between the plurality of the fundamental patterns, as the interpolated patterns. Also, superposition images which occur when the Kohonen's self-organization is applied directly do not occur during the learning operations of the neural network. It becomes possible to discriminate information, which has not been learned, by utilizing the results of the learning operations during the discrimination, or the like.

Additionally, because superposition images do not occur during the learning operations of the neural network, gray level images can be used as the fundamental patterns during the learning operations.

With the third pattern learning method in accordance with the present invention, the aforesaid second pattern learning method in accordance with the present invention is modified such that, of the selected fundamental patterns, which best match with the cells falling within the region that has its center at the neighboring cell and that has a range larger than the range of the neighboring region, a selected fundamental pattern is not used during the spatial interpolating operations which best matches with the same cell as the cell best matching with the fundamental pattern having been presented to the neural network and which is different from the fundamental pattern having been presented to the neural network. Therefore, during the learning operations, the ordering can proceed appropriately.

With the fourth pattern learning method in accordance with the present invention, the aforesaid second or third pattern learning method in accordance with the present invention is modified such that, in the neural network, results of the learning with the Kohonen's self-organization with respect to the plurality of the fundamental patterns or results obtained from manual presentation of the plurality of the fundamental patterns are utilized as the initial values of the weights of connections of the large number of the cells. Therefore, the learning operations of the neural network can be carried out more efficiently.

With the fifth pattern learning method in accordance with the present invention, the aforesaid second, third, or fourth pattern learning method in accordance with the present invention is modified such that information representing a plurality of feature points, which are common to the plurality of the fundamental patterns, and information representing the density values of respective picture elements in each of the fundamental patterns are presented to the neural network for each of the fundamental patterns. The learning of the weight of connection of the neighboring cell is carried out in accordance with the interpolated patterns, which have been obtained from spatial interpolating operations with respect to the feature points and the density values.

With the sixth pattern learning method in accordance with the present invention, the aforesaid second, third, or fourth pattern learning method in accordance with the present invention is modified such that information representing a plurality of feature points, which are common to the plurality of the fundamental patterns, is presented to the neural network for each of the fundamental patterns. The learning of the weight of connection of the neighboring cell is carried out in accordance with interpolated patterns, which have been obtained from spatial interpolating operations with respect to the feature points. In cases where only the information representing the feature points of the fundamental patterns is thus presented to the neural network, the number of pieces of information presented to the neural network can be kept small, and therefore the time required for the calculations before the learning operations are finished can be kept short.

With the seventh pattern learning method in accordance with the present invention, the aforesaid sixth pattern learning method in accordance with the present invention is modified such that, after the learning with the feature points of the fundamental patterns has been iterated until the large number of the cells finish their learning operations, the density values of respective picture elements in each of patterns, which are intermediate between the fundamental patterns, are allocated to the respective cells of the neural network in accordance with the results of the learning with respect to the feature points of the fundamental patterns. Therefore, as in the pattern learning method in accordance with the present invention wherein the density values of the patterns having been spatially interpolated from the fundamental patterns are learned, the neural network can learn patterns free of superposition images resulting from the superposition of the fundamental patterns upon each other.

BRIEF DESCRIPTION OF THE DRAWINGS

FIG. 1 is a block diagram showing the fundamental concept behind the pattern learning method in accordance with the present invention, FIG. 21 is an explanatory view showing cells of the neural network in which the fundamental patterns have been mapped with 3,500 times of learning operations, FIG. 22 is an explanatory view showing cells of the neural network which has been topologically mapped with 3,500 times of learning operations.

DESCRIPTION OF THE PREFERRED EMBODIMENTS

Figure 2:
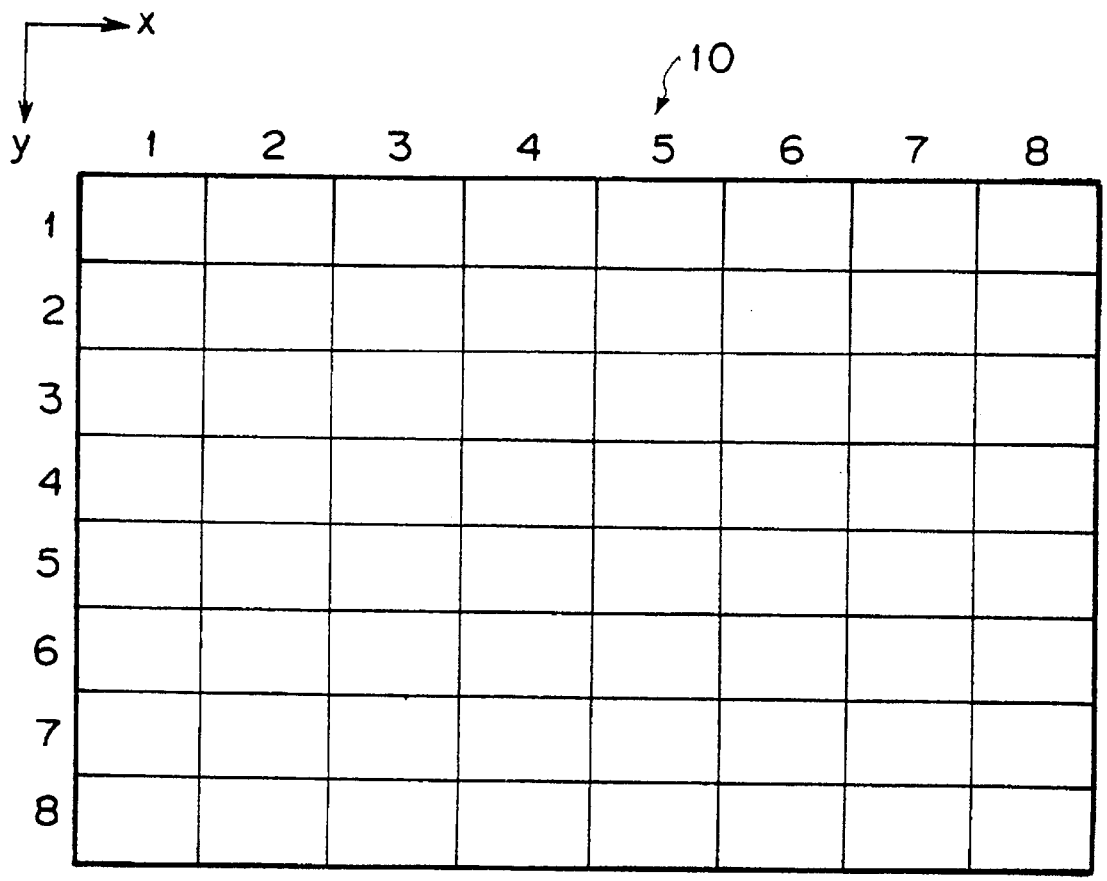
FIG. 2 is an explanatory view showing the cells of a neural network, the learning operations of which are carried out with a first embodiment of the pattern learning method in accordance with the present invention.

The present invention will hereinbelow be described in further detail with reference to the accompanying drawings.

FIG. 1 is a block diagram showing the fundamental concept behind the pattern learning method in accordance with the present invention.

As illustrated in FIG. 1, in the pattern learning method in accordance with the present invention, information representing a single fundamental pattern Ai, which is among n number of fundamental patterns Ai through An, is presented to a neural network. The neural network has a large number of cells having small random initial values of the weights of connections. Degrees of matching between all of the cells and the fundamental pattern Ai are calculated, and a cell which best matches with the fundamental pattern Ai is found. Thereafter, a neighboring region having its center at the best matching cell is set. For the cells (i.e., the neighboring cells) which fall within the neighboring region, operations for learning the weights of connections of the neighboring cells are carried out by utilizing patterns, which have been created by carrying out spatial interpolating operations from fundamental patterns. The spatial interpolating operations are carried out from the fundamental patterns, which best match with the cells falling within a predetermined region having its center at each neighboring cell whose learning operation is to be carried out, in accordance with the relationship between the position of the neighboring cell whose learning operation is to be carried out and the positions of the cells, with which the selected fundamental patterns best match. Pieces of the information representing the other fundamental patterns among the n number of the fundamental patterns Ai through An are then sequentially presented to the neural network, and the learning operation is carried out the same number of times as the number n of all fundamental patterns Ai through An. The learning operation is iterated until the topological mapping of the neural network is completed.

A first embodiment of the pattern learning method in accordance with the present invention will hereinbelow be described in detail. In the first embodiment, during the learning operation, pieces of information representing the feature points of an open eye pattern 10, a closed eye pattern 11, and a rightward-directed eye pattern 12, which are shown in FIG. 3 and serve as the fundamental patterns, and pieces of information representing the density values of the respective picture elements in these fundamental patterns are fed in this order into 64 cells of the neural network shown in FIG. 2. (In this embodiment, the cells are distributed in square forms.) The steps, in which the pieces of the information representing the open eye pattern 10, the closed eye pattern 11, and the rightward-directed eye pattern 12 are respectively once presented to the neural network, constitute a single learning operation. The learning operation is iterated (400 times) until the learning operations of the large number of the cells are finished. By way of example, in this embodiment, the values of the input vectors for the open eye pattern 10, the closed eye pattern 11, and the rightward-directed eye pattern 12 are respectively represented by B10, B11, and B12. (Each of the eye patterns shown in FIG. 3 has 80×56 picture elements. Therefore, the vectors are of 80×56 dimensions.)

Figure 3:
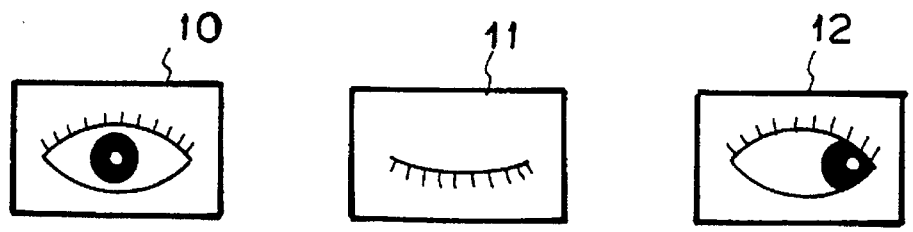
FIG. 3 is a schematic view showing fundamental patterns utilized in the first embodiment of the pattern learning method in accordance with the present invention.

First, initial values Q(0) of the weights of connections of the respective cells of the neural network shown in FIG. 2 are determined. The initial values Q(0) of the weights of connections of the respective cells take small random values and are normalized such that their sum may be equal to unity. (As in the input vectors, the weights of connections of the respective cells are of 80×56 dimensions.)

During the first learning operation, the information representing the open eye pattern 10 is presented to the neural network. As described above, the degrees of matching with the open eye pattern 10 are calculated for all of the cells of the neural network, and a cell, with which the open eye pattern 10 best matches, is found. This process is represented by Formula (1).

$$f_c(t) = \|x(t) - m_c(t)\| = \min_i \{\|x(t) - m_i(t)\|\} \quad (1)$$

wherein fc represents the degree of best matching, x represents the input vector of the fundamental pattern, m represents the vector of the weight of connection of the cell, and t represents the discrete time.

Ordinarily, the degree of best matching fc is calculated in terms of the distance (the square-sum of difference). For example, in cases where input vector of the fundamental pattern and the vector of the weight of connection of the cell correspond to the image of N×N pixels, the degree of best matching fc can be represented by the formulas shown below.

$$f_c = \sum_{i=1}^{N}\sum_{j=1}^{N} [x_{ij}(t) - m_{ij}(t)]^2 \quad (2)$$

When N=2, $$f_c = [x_{11}(t) - m_{11}(t)]^2 + [x_{12}(t) - m_{12}(t)]^2 + \quad (3)$$
$$[x_{21}(t) - m_{21}(t)]^2 + [x_{22}(t) - m_{22}(t)]^2$$

Figure 4:
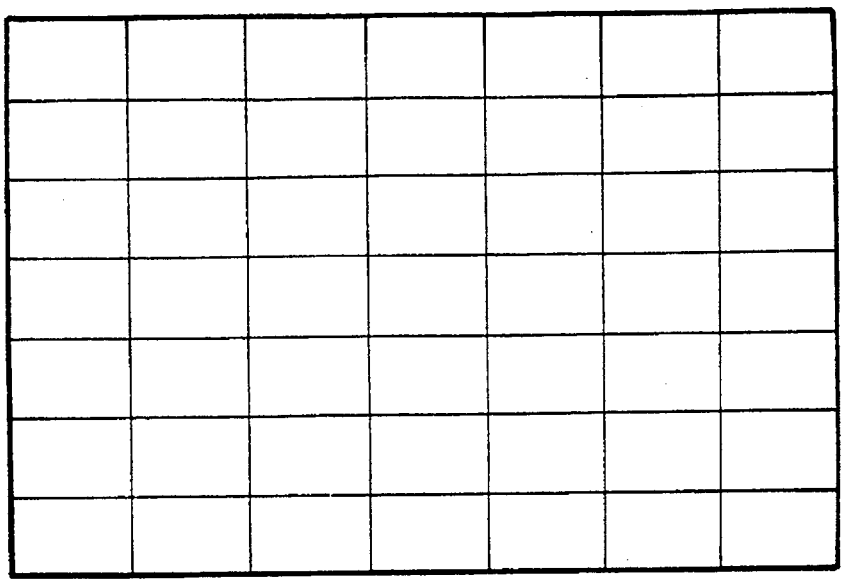
FIG. 4 is an explanatory view showing a neighboring region utilized in the first embodiment of the pattern learning method in accordance with the present invention.

In cases where it has been found from the calculations that the open eye pattern 10 best matches with a cell (4,3), the neural network employed in this embodiment carries out its learning operation for the cells, which fall within a neighboring region Nc having its center at the cell (4,3). As illustrated in FIG. 4, in this embodiment, the neighboring region Nc has a 7×7 quadrangular shape. In this embodiment, the size of the neighboring region Nc is represented in terms of the length nc of one side of the quadrangle as shown below.

$$nc=7 \quad (4)$$

Specifically, the learning operation is carried out for the cells falling within the 7×7 quadrangle having its center at the cell (4,3). How the learning operation is carried out for a cell (1,1) will be described hereinbelow. The pattern learning method in accordance with the present invention is different from the conventional Kohonen's self-organization in that the patterns used during the learning operation (i.e., the updating of the weight) are created with spatial interpolating operations in the manner described below. Specifically, during the learning operation for the cell (1,1), (a) fundamental patterns are selected which best match the cells falling within a region, which has a radius R and has its center at the cell (1,1), (b) learning patterns are created by carrying out spatial interpolating operations from all of the selected fundamental patterns [the proportions of interpolation are calculated from the relationship between the position of the cell, the weight of which is to be updated, i.e., the cell (1,1) in this case, and the positions of the cells, with which the selected fundamental patterns best match], and (c) the patterns obtained from the spatial interpolating operations are utilized during the learning operation of the cell (1,1).

Ordinarily, the range on which the spatial interpolating operations are carried out is set to be larger than the neighboring region Nc. In this embodiment, the radius R is determined with the formula $$R=nc/2+1 \quad (5)$$

Figure 5:
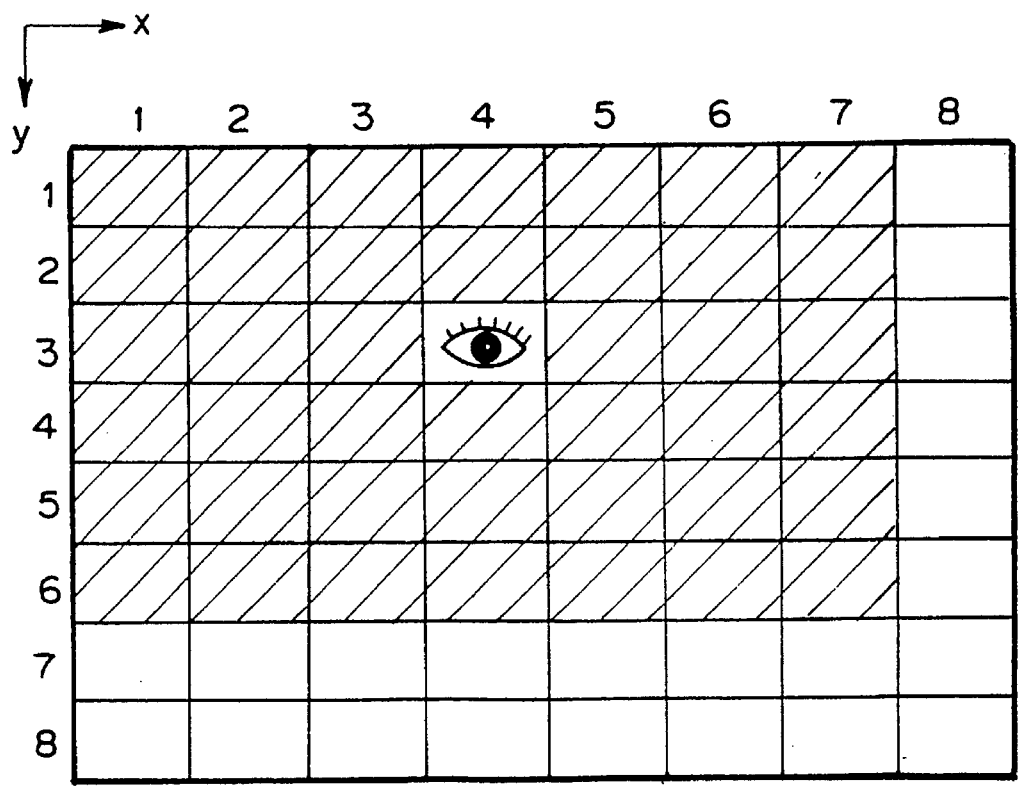
FIG. 5 is an explanatory view showing the state in which an open eye pattern is best matched with a cell during a first learning operation.

In this case, the open eye pattern 10 is the fundamental pattern first presented to the neural network. Therefore, of the cells falling within the region, which has the radius R and has its center at the cell (1,1), no cell best matches with the fundamental patterns (i.e., the closed eye pattern 11 and the rightward-directed eye pattern 12) other than the pattern having been presented to the neural network. Therefore, in this case, spatial interpolating operations are carried out only with the open eye pattern 10. Specifically, the open eye pattern 10 itself is learned. This learning also applies to the learning operation of the other neighboring cells. Accordingly, as illustrated in FIG. 5, the cells (hatched in FIG. 5) falling within the neighboring region Nc having its center at the cell (4,3), with which the open eye pattern 10 best matches, learn the open eye pattern 10. In general, this learning process is represented by the formula $$m_i(t+1)=m_i(t)+\alpha(t)\{x_i'(t) - m_i(t)\} \text{ for } i \in Nc$$
$$m_i(t+1)=m_i(t) \text{ otherwise} \quad (6)$$

wherein Nc represents the neighboring region having a range with a predetermined size and having its center at the cell, with which the fundamental pattern having been presented to the neural network best matches, α(t) represents the learning factor, and xi'(t) represents the spatially interpolated pattern.

Figure 6:
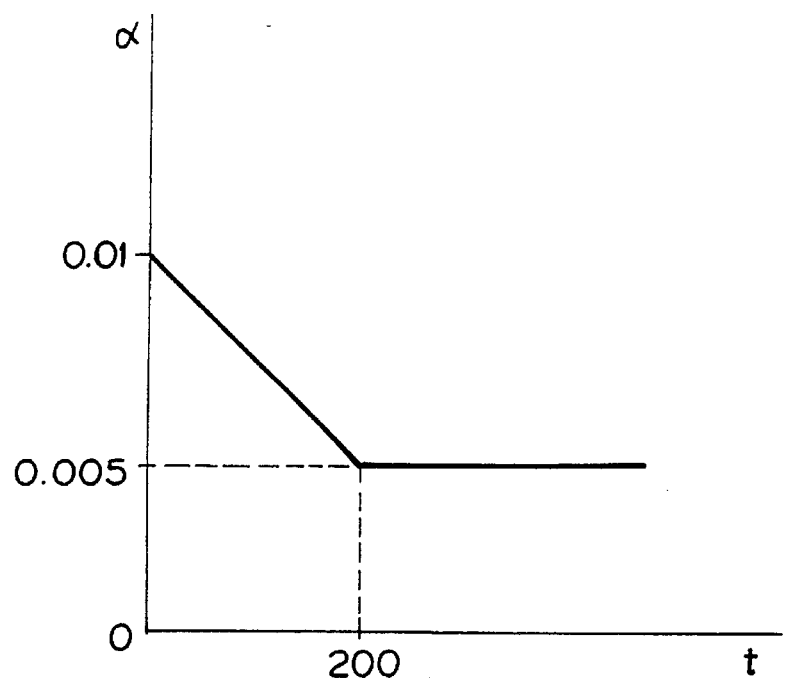
FIG. 6 is a graph showing characteristics of a learning factor $\alpha(t)$ used in the first embodiment of the pattern learning method in accordance with the present invention.

In the conventional Kohonen's self-organization, the neighboring region Nc in Formula (6) is reduced with the passage of time. On the other hand, with the pattern learning method in accordance with the present invention, the neighboring region Nc in Formula (6) is kept constant regardless of the passage of time. Also, the learning factor α(t) is decreased with the passage of time and is set such that $$\alpha(t)=0.01-0.000025t \quad 0 \leq t < 200$$
$$\alpha(t)=0.005 \text{ otherwise} \quad (7)$$

wherein t represents the number of calculations. Specifically, the learning factor α(t) has the characteristics shown in FIG. 6.

Therefore, xi'(t)=B10 for all of the cells (m,n) hatched in FIG. 5, and the learning operation is carried out such that $$Q(1)_{m,n}=Q(0)_{m,n}+\alpha(1) \times [B_{10}-Q(0)_{m,n}] \quad (8)$$

wherein $Q(t)_{m,n}$ represents the value of the weight vector in the cell (m,n).

The information representing the closed eye pattern 11 is then presented to the neural network. As in the case of the open eye pattern 10, the closed eye pattern 11 best matches with the cell (4,3). Therefore, the learning operation is carried out on the cells falling with the neighboring region having its center at the cell (4,3). For example, as for the cell (1,1), the fundamental patterns utilized during the spatial interpolating operations include the closed eye pattern 11, which has been most recently presented to the neural network, and the open eye pattern 10, which serves as the other fundamental pattern, both of them best matching with the cell (4,3) falling within the region, which has the radius R and has its center at the cell (1,1). Specifically, the spatial interpolating operations will be carried out from the open eye pattern 10 and the closed eye pattern 11.

However, in this case, a plurality of fundamental patterns, i.e., the open eye pattern 10 and the closed eye pattern 11, best match the same cell (4,3), and such fundamental patterns include the closed eye pattern 11 which has most recently been presented to the neural network. In such cases, a rule is employed such that a fundamental pattern is not used during the spatial interpolating operations which best matches with the same cell as the cell (4,3) best matching with the fundamental pattern having most recently been presented to the neural network and which is different from the fundamental pattern having most recently been presented to the neural network. Therefore, in this case, only the closed eye pattern 11 is selected as the fundamental pattern to be used during the spatial interpolating operations. This rule is employed such that a plurality of fundamental patterns may not match with a single cell (i.e., such that the ordering may effected). Specifically, the cell (1,1) learns the closed eye pattern 11. This learning also applies to the learning operation of the other neighboring cells. Accordingly, as illustrated in FIG. 7, in the cells (hatched in FIG. 7) falling within the neighboring region Nc having its center at the cell (4,3), the learning operation is carried out in accordance with the formula $$Q'(1)_{m,n} = Q(1)_{m,n} + \alpha(1) \times [B_{11} - Q(1)_{m,n}] \quad (9)$$

Figure 7:
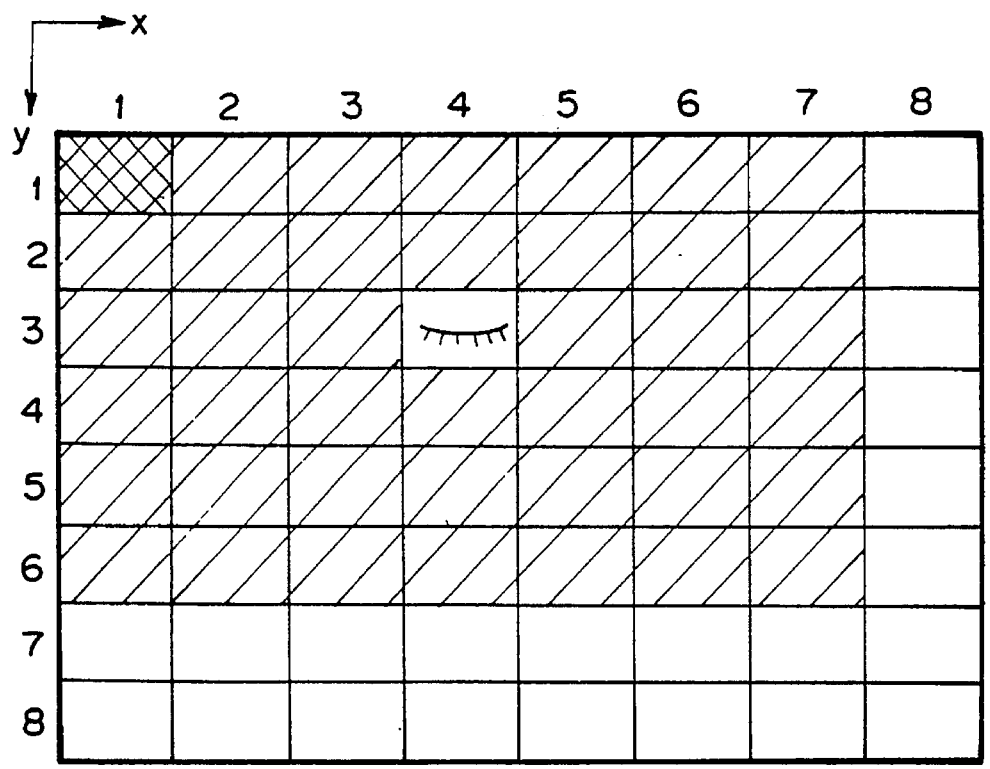
FIG. 7 is an explanatory view showing the state in which a closed eye pattern is best matched with a cell during the first learning operation.

FIG. 7 illustrates such that only the closed eye pattern 11 best matches with the cell (4,3). However, actually, as described above, the open eye pattern 10 also best matches with the cell (4,3).

Thereafter, at the final stage of the first learning operation, the information representing the rightward-directed eye pattern 12 is presented to the neural network. As in the cases of the open eye pattern 10 and the closed eye pattern 11, the rightward-directed eye pattern 12 best matches with the cell (4,3). In this case, the same rule is applied as in the case where the information representing the closed eye pattern 11 was presented to the neural network, and therefore the open eye pattern 10 and the closed eye pattern 11 are not used during the spatial interpolating operations. Therefore, the rightward-directed eye pattern 12 itself remains, and the cells falling within the neighboring region Nc having its center at the cell (4,3) carry out the learning operation in accordance with the formula $$Q''(1)_{m,n} = Q'(1)_{m,n} + \alpha(1) \times [B_{12} - Q'(1)_{m,n}] \quad (10)$$

Thereafter, pieces of the information representing the open eye pattern 10, the closed eye pattern 11, and the rightward-directed eye pattern 12 are fed sequentially and repeatedly into the neural network. The learning operations of the cells of the neural network are carried out in the same manner as that in the first learning operation described above. Up to the ninth learning operation, all of the fundamental patterns, i.e., the open eye pattern 10, the closed eye pattern 11, and the rightward-directed eye pattern 12, continue to best match with the cell (4,3), and the learning operations are carried out in the manner described above.

During the tenth learning operation, when the information representing the open eye pattern 10 is presented to the neural network, the open eye pattern 10 best matches with a cell (6,6). Also, the other fundamental patterns, i.e., the closed eye pattern 11 and the rightward-directed eye pattern 12 best match with the cell (4,3).

Figure 8:
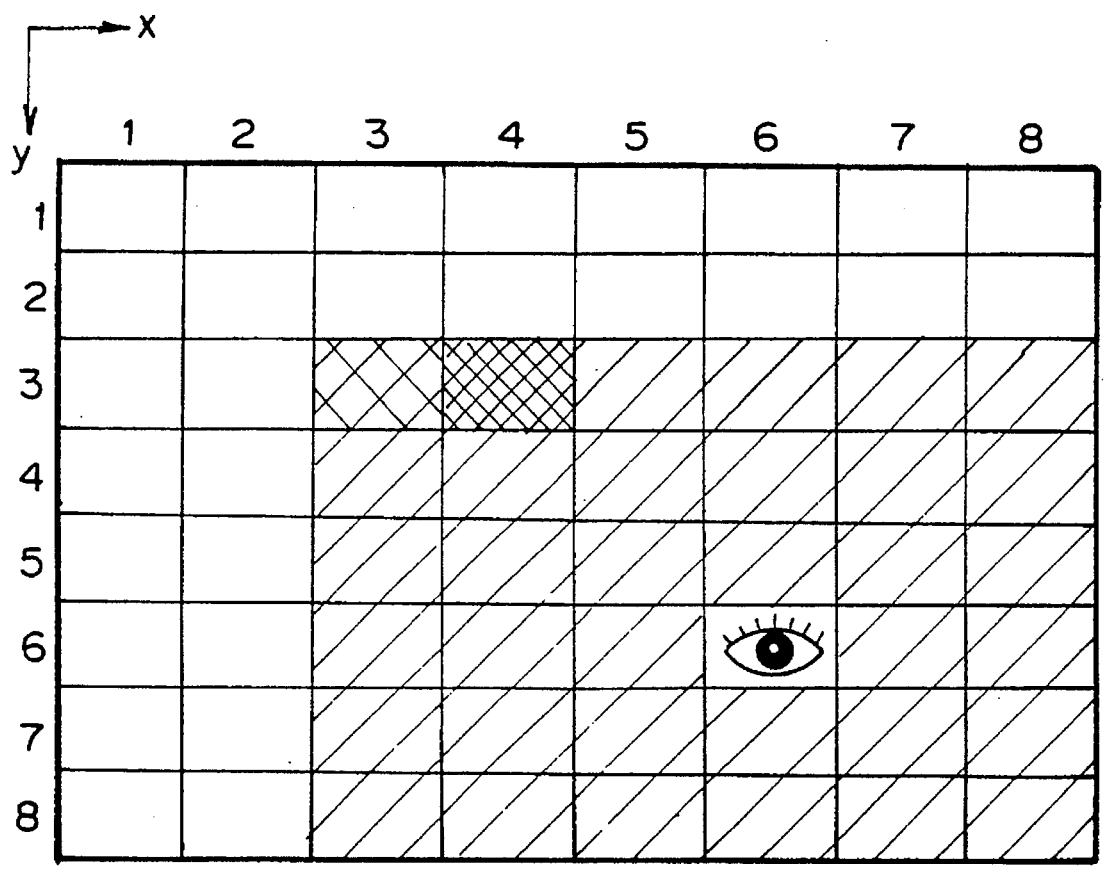
FIG. 8 is an explanatory view showing a neighboring region which is set when information representing an open eye pattern is presented to the neural network during a tenth learning operation.

Therefore, as illustrated in FIG. 8, in cases where the information representing the open eye pattern 10 is presented to the neural network during the tenth learning operation, the cells falling within a neighboring region Nc having its center at the cell (6,6) carry out the learning operation. For example, during the learning operation of a cell (3,3), the fundamental patterns best matching with the cells falling within a region, which has a radius R and has its center at the cell (3,3), include the open eye pattern 10 best matching with the cell (6,6), and the closed eye pattern 11 and the rightward-directed eye pattern 12 which best match the cell (4,3). These fundamental patterns are selected as the fundamental patterns to be used during the spatial interpolating operations for the cell (3,3).

How the spatial interpolating operations are carried out will hereinbelow be described in detail.

The distance da between the cell (6,6), with which the fundamental pattern most recently presented to the neural network, i.e., the open eye pattern 10, best matches, and the cell (3,3) is represented by the formula $$d_a = \sqrt{(6-3)^2 + (6-3)^2} \quad (11)$$

The distance db between the cell (4,3), with which the closed eye pattern 11 best matches, and the cell (3,3) is represented by the formula $$d_b = \sqrt{(4-3)^2 + (3-3)^2} \quad (12)$$

The distance dc between the cell (4,3), with which the rightward-directed eye pattern 12 best matches, and the cell (3,3) is represented by the formula $$d_c = \sqrt{(4-3)^2 + (3-3)^2} \quad (13)$$

Figure 9A:
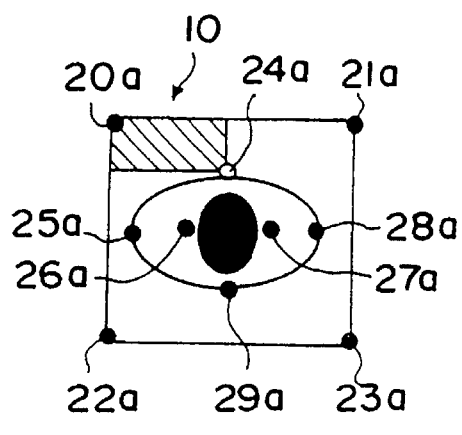
FIGS. 9A, 9B, and 9C are explanatory views showing how spatial interpolating operations are carried out.
Figure 9B:
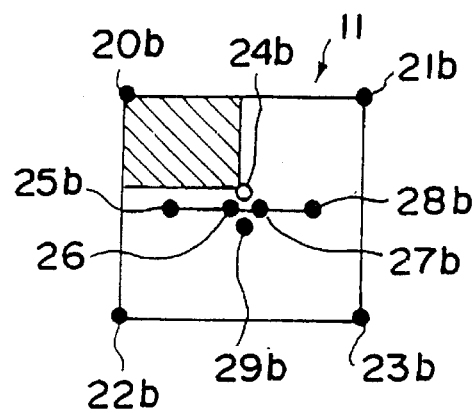
Figure 9C:
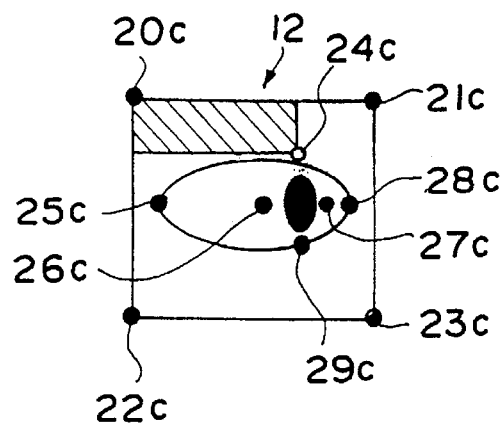

Also, as illustrated in FIGS. 9A, 9B, and 9C, reference points (i.e., feature points) 20a through 29a of the open eye pattern 10, reference points (i.e., feature points) 20b through 29b of the closed eye pattern 11, and reference points (i.e., feature points) 20c through 29c of the rightward-directed eye pattern 12 are set. The positions of these feature points on the images are determined for use during the spatial interpolating operations.

In cases where the feature points 24a, 24b, and 24c respectively have coordinates (xa1,ya1), (xb1,yb1), and (xc1,yc1), positions of new feature points on images, which are created by the spatial interpolating operations, can be calculated from degrees of dependence (P), which are calculated from the distances obtained from Formulas (11), (12), and (13). The calculation of the positions of the new feature points can be carried out with the formulas shown below.

When da≠0, $$P(a) = \frac{1/(d_a + s(a))}{1/(d_a + s(a)) + 1/(d_b + s(b)) + 1/(d_c + s(c))} \quad (14)$$

$$P(b) = \frac{1/(d_b + s(b))}{1/(d_a + s(a)) + 1/(d_b + s(b)) + 1/(d_c + s(c))}$$

$$P(c) = \frac{1/(d_c + s(c))}{1/(d_a + s(a)) + 1/(d_b + s(b)) + 1/(d_c + s(c))}$$

In Formula (14), s(a), s(b), and s(c) are the constants for effecting the ordering and can be represented as follows:

$$s(a) = \begin{cases} 0 \ (d_a \neq 0) \\ \text{constant} \ (d_a = 0) \end{cases} \quad (16)$$

$$s(b) = \begin{cases} 0 \ (d_b \neq 0) \\ \text{constant} \ (d_b = 0) \end{cases}$$

$$s(c) = \begin{cases} 0 \ (d_c \neq 0) \\ \text{constant} \ (d_c = 0) \end{cases}$$

From the degrees of dependence P(a), P(b), and P(c), which have been calculated from Formulas (14) and (15), the coordinates (x1',y1') of the new feature points are calculated with the formulas $$x_1' = x_{a1} \times P(a) + x_{b1} \times P(b) + x_{c1} \times P(c) \quad (17)$$

$$y_1' = y_{a1} \times P(a) + y_{b1} \times P(b) + y_{c1} \times P(c) \quad (18)$$

Figure 10:
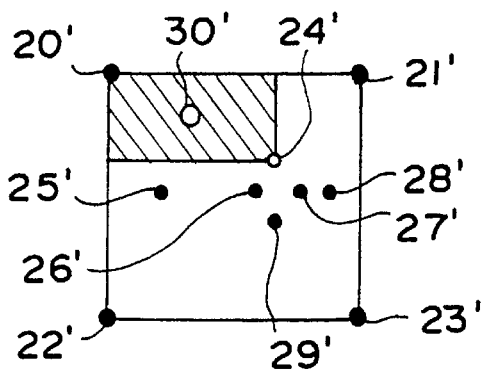
FIG. 10 is an explanatory view showing how spatial interpolating operations are carried out.

As illustrated in FIG. 10, when the processing described above is carried out for all of the feature points 20a through 29a, 20b through 29b, and 20c through 29c, the positions of new feature points 20' through 29' can be determined from the respective feature points.

Figure 11A:
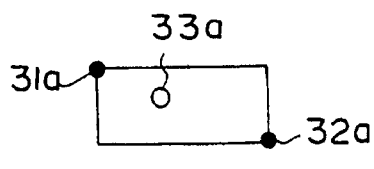
FIGS. 11A, 11B, and 11C are explanatory views showing how spatial interpolating operations are carried out.
Figure 11B:
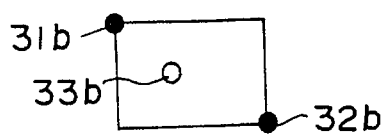
Figure 11C:
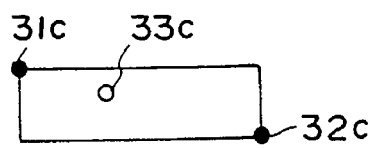

Thereafter, the values of the picture elements, i.e., the density values, at all positions are calculated. For example, when the hatched areas shown in FIGS. 9A, 9B, and 9C and FIG. 10 are considered, a density value g(xk',yl') of the feature point, which has the coordinates (xk',yl') and is represented by a point 30' in the hatched area shown in FIG. 10, can be calculated with the formula $$g(x_k', y_1') = g(x_{ak}, y_{al}) \times P(a) + \quad (19)$$
$$g(x_{bk}, y_{bl}) \times P(b) +$$
$$g(x_{ck}, y_{cl}) \times P(c)$$

wherein (xak,yal) represents the coordinates indicated by a point 33a shown in FIG. 11A and is calculated with the formulas $$x_{ak} = x_{a1} - \frac{x_1' - x_k'}{x_1' - x_2'} \times (x_{a1} - x_{a2}) \quad (20)$$

$$y_{al} = y_{a1} - \frac{y_1' - y_l'}{y_1' - y_2'} \times (y_{a1} - y_{a2}) \quad (21)$$

where (xa1,ya1) represents the coordinate values of a point 31a shown in FIG. 11A, (xa2,ya2) represents the coordinate values of a point 32a shown in FIG. 11A, (x1',y1') represents the coordinate values of the point 20' shown in FIG. 10, and (x2',y2') represents the coordinate values of the point 24' shown in FIG. 10. In the same manner as that in Formulas (20) and (21), coordinates (xbk,ybl) of a point 33b shown in FIG. 11B and coordinates (xck,ycl) of a point 33c shown in FIG. 11C can be calculated.

Figure 12:
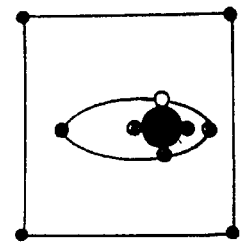
FIG. 12 is an explanatory view showing how a pattern, which is intermediate between the open eye pattern and the closed eye pattern, is formed as a result of spatial interpolating operations.

The new feature points and the density values are calculated with the spatial interpolating operations in the manner described above. In this manner, as illustrated in FIG. 12, an eye pattern is obtained with the spatial interpolating operations from the open eye pattern 10, the closed eye pattern 11, and the rightward-directed eye pattern 12.

In the embodiment described above, the spatial interpolating operations are carried out from the open eye pattern 10, the closed eye pattern 11, and the rightward-directed eye pattern 12. In general, an interpolated pattern is obtained in the manner described below.

Of the fundamental patterns presented to the neural network, the fundamental patterns having been selected for use in the spatial interpolating operations in accordance with the positional relationship with respect to the cell, the weight of connection of which is to be updated, are represented as (1, 2, . . . , N). If the fundamental pattern having been fed most recently into the neural network is represented by m, the degrees of dependence to be used during the calculations of the positions of the new feature points can be calculated with the formula shown below.

When d(m)≠0, $$P(i) = \frac{1/(d(i) + s(i))}{\sum_{j=1}^{N} 1/(d(j) + s(j))} \quad (22)$$

wherein $$s(j) = \begin{cases} 0 \ (d(j) \neq 0) \\ \text{constant} \ (d(j) = 0, j \neq m) \end{cases} \quad (23)$$

and d(i) represents the distance between the cell, the weight of which is to be updated, and the cell, with which the i'th fundamental pattern Ai best matches.

When d(m)=0, $$\begin{cases} P(m) = 1 \\ P(i) = 0 \ (i = 1,2, \ldots N, 1 \neq m) \end{cases} \quad (24)$$

Therefore, if the coordinates of a certain feature point of the fundamental pattern Ai selected for the spatial interpolating operations are represented by (x(i),y(i)), the coordinates (x',y') of a new feature point can be calculated with the formulas $$x' = \sum_{i=1}^{N} x(i) \times P(i) \quad (25)$$

$$y' = \sum_{i=1}^{N} y(i) \times P(i) \quad (26)$$

The density value at the coordinates (xk',yl') in the image obtained from the spatial interpolating operations is calculated with the formula $$g(x_k', y_1') = \sum_{i=1}^{N} g(x_k(i), y_l(i)) \times P(i) \quad (27)$$

In Formula (27), (kx(i),yl(i)) represents the coordinates calculated in accordance with the proportional relationship with respect to the feature points in the respective fundamental patterns. Specifically, with reference to FIG. 11A, for example, when i=a, the coordinates (x(i),y(i)), (x2(i),y2(i)), and (xk(i),yl(i)) respectively correspond to the point 31a, the point 32a, and the point 33a. Also, at this time, the coordinates (x1',y1'), (x2',y2'), and (xk',yl') respectively correspond to the point 20', the point 24', and the point 30' shown in FIG. 10. Therefore, the coordinates (xk(i),yl(i)) are calculated with the proportional relationship shown below.

$$x_k(i) = x_1(i) - \frac{x_1' - x_k'}{x_1' - x_2'} \times (x_1(i) - x_2(i)) \quad (28)$$

$$y_l(i) = y_1(i) - \frac{y_1' - y_l'}{y_1' - y_2'} \times (y_1(i) - y_2(i)) \quad (29)$$

A pattern R1 is created from the spatial interpolating operations in the manner described above, and the learning operation with respect to the weight of connection of the cell (3,3) is carried out with Formula (31) by using the pattern R1. In this embodiment, an ordering constant s(j) is set as follows:

$$s(j) = \begin{cases} 0 & (d(j) = 0) \\ \sqrt{2} & (d(j) \neq 0, j \neq m) \end{cases} \quad (30)$$

$$Q(10)_{3,3} = Q''(9)_{3,3} + \alpha(10) \times (R_1 - Q''(9)_{3,3}) \quad (31)$$

Thereafter, the learning operation of the other neighboring cells is carried out in the same manner as that described above. Also, the pieces of the information representing the closed eye pattern 11 and the rightward-directed eye pattern 12 are presented to the neural network, and the learning operation is carried out in the same manner as that described above. In this manner, the tenth learning operation is completed.

When the learning operations described above progress, the ordering of the fundamental patterns presented to the neural network progresses. In this embodiment, at the time at which 120 times of learning operations have been carried out, the cell, with which the rightward-directed eye pattern 12 best matches, shifts to the cell (1,1). At the time at which 190 times of learning operations have been carried out, the cell, with which the closed eye pattern 11 best matches, shifts to the cell (6,1).

In this embodiment, as described above, the ordering progresses sharply at a certain stage. How the ordering progresses changes in accordance with how the initial values and the parameters are given. For example, it often occurs that the ordering progresses such that the position, with which the pattern presented to the neural network best matches, shifts little by little away from the previous position.

Figure 13:
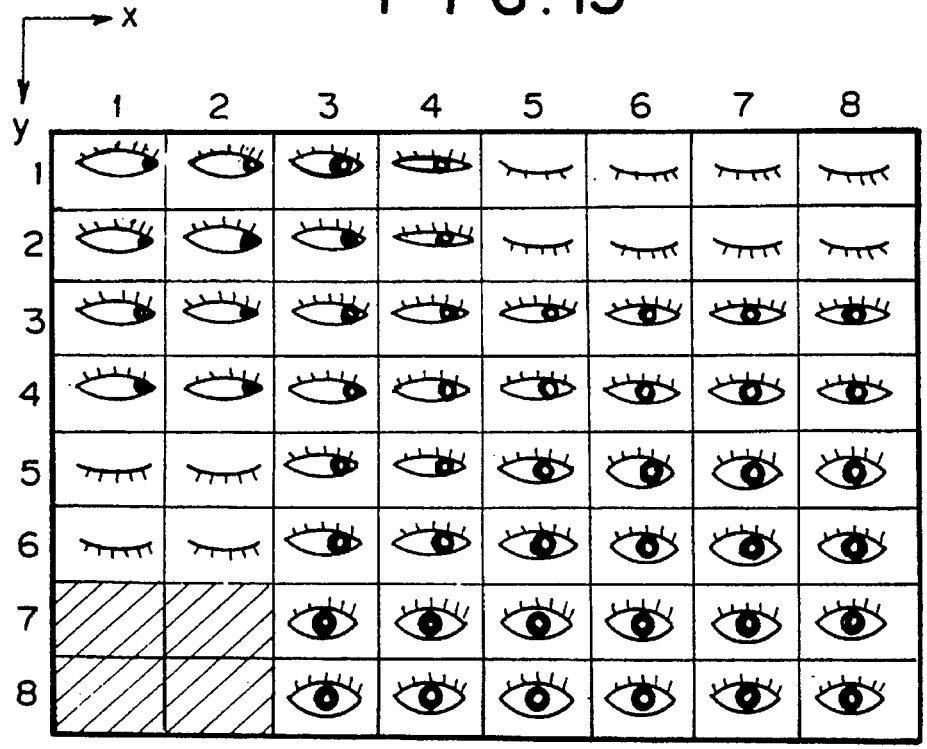
FIG. 13 is an explanatory view showing cells of the neural network which has been topologically mapped with 400 times of learning operations.

The learning operations progress in the manner described above. During the 400th learning operation, the cells of the neural network shown in FIG. 2 become as those shown in FIG. 13. In FIG. 13, the open eye pattern 10 best matches with the cell (6,6), the closed eye pattern 11 best matches with the cell (6,1), and the rightward-directed eye pattern 12 best matches with the cell (1,1). As illustrated in FIG. 13, the cells located between the cells, with which the open eye pattern 10 and the closed eye pattern 11 best match, have learned half-open eye patterns. The cells located between the cells, with which the closed eye pattern 11 and the rightward-directed eye pattern 12 best match, have learned half-open, rightward-directed eye patterns. Also, the cells located approximately in the middle among the cells, with which the open eye pattern 10, the closed eye pattern 11, and the rightward-directed eye pattern 12 best match, have learned half-open, slightly rightward-directed eye patterns.

In the state shown in FIG. 13, the learning operations of the neural network are approximately completed.

The learning operations of the neural network may be carried out for the left and right eyes and a mouth of a human body, and the neural network may thereby be adapted to a system for discriminating human face patterns by utilization of the architecture of a neocognitron. Specifically, for such purposes, the neural network is caused to learn a plurality of fundamental patterns with respect to a plurality of feature parts, such as eye and mouth patterns, of a predetermined object image, such as an image of a human face, by using the pattern learning method in accordance with the present invention. The architecture of the neocognitron is utilized to make a judgment as to whether feature parts of a candidate for the predetermined object image are or are not included in the plurality of the feature patterns which have been learned. Also, the architecture of the neocognitron is utilized to make a judgment as to whether the relationship between the positions of the feature parts of the candidate for the predetermined object image coincides or does not coincide with the relationship between the positions of the feature parts of the predetermined object image. The system can thereby be built up which discriminates whether the candidate for the predetermined object image is or is not the predetermined object image. In this manner, it becomes possible to discriminate information, which has not been learned, other than the fundamental patterns. For example, a discrimination system can be built up which can cope with changes in the positions and the shapes of eye and mouth patterns and changes in the facial expression, and which can discriminate patterns of faces of different persons and is unaffected by a shift in position of a pattern. The learning operations can be carried out for the eye and mouth patterns and any of other feature patterns.

In the embodiment described above, the pieces of information representing three kinds of the fundamental patterns are presented to the neural network, and the neural network has 64 cells in the 8×8 quadrangle. However, no limitation is imposed on the number of the fundamental patterns presented to the neural network and the number of the cells of the neural network. Also, the cells may have a circular shape. Additionally, the arrangement of the cells is not limited to the two-dimensional arrangement and may be of other dimensions.

Further, in the aforesaid embodiment, in accordance with the shape of the cells of the neural network, the neighboring region Nc is set so as to have the 7×7 quadrangular shape. The shape of the neighboring region Nc is not limited to the quadrangle. The neighboring region Nc may have a circular shape or any of other shapes. The arrangement of the neighboring region Nc is not limited to the two-dimensional arrangement and may be of other dimensions.

A second embodiment of the pattern learning method in accordance with the present invention will be described hereinbelow. In the second embodiment, during the learning operation, pieces of information representing the feature points of a rightward-directed face pattern 50, a front-directed face pattern 51, a leftward-directed face pattern 52, an upward-directed face pattern 53, and a downward-directed face pattern 54, which are shown in FIG. 15 and serve as the fundamental patterns, are fed in this order into 64 cells of the neural network shown in FIG. 14. (In this embodiment, the cells are distributed in square forms.)

In this embodiment, the respective patterns are trued up with respect to the heights of the ear parts. Thereafter, eight feature points, i.e., a right eye part, a left eye part, a nose part, a mouth part, and four corner parts of each image, are extracted from each of the patterns and used. Pieces of information representing the coordinate values (hereinbelow referred to as the position coordinates) of the feature points are presented to the neural network. Specifically, each of the cells of the neural network shown in FIG. 14 can learn, as the weight of connection, the same number of (in this embodiment, eight) coordinate values as that of the sets of the position coordinates of the feature points. As the feature points of each of the face patterns shown in FIG. 15, the position coordinates of the feature points extracted from each of the face patterns, which have been trued up with respect to the heights of the ear parts and each of which is constituted of 128×128 picture elements, are plotted such that the left top corner point of each face pattern may have coordinates (0,0) and the right bottom corner point may have coordinates (127,127). In this embodiment, the sets of the position coordinates of the rightward-directed face pattern 50, the front-directed face pattern 51, the leftward-directed face pattern 52, the upward-directed face pattern 53, and the downward-directed face pattern 54 are respectively represented by B50, B51, B52, B53, and B54. The steps, in which the pieces of the information representing the sets of the position coordinates of the feature points of these face patterns are respectively once presented to the neural network, constitute a single learning operation. The learning operation is iterated (3,500 times) until the learning operations of the large number of the cells are finished.

Figure 14:
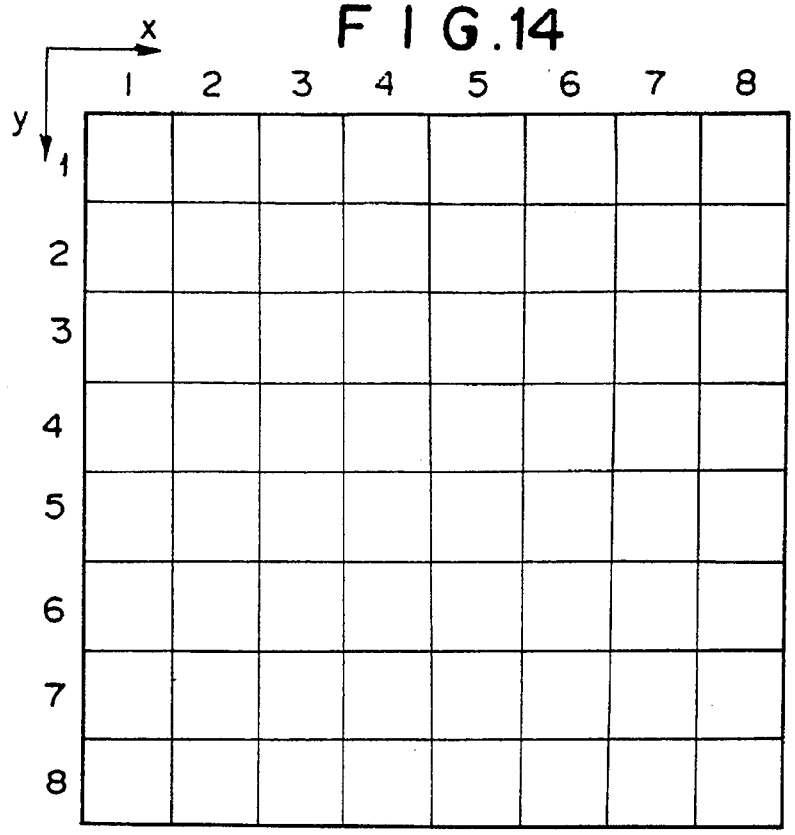
FIG. 14 is an explanatory view showing the cells of a neural network, the learning operations of which are carried out with a second embodiment of the pattern learning method in accordance with the present invention.
Figure 15:
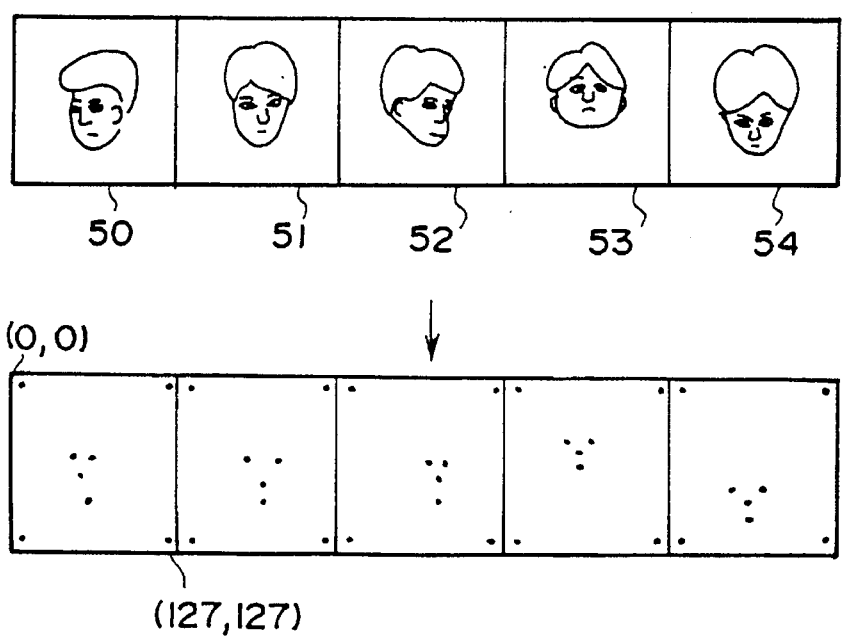
FIG. 15 is a schematic view showing fundamental patterns utilized in the second embodiment of the pattern learning method in accordance with the present invention.

First, initial values Q(0) of the weights of connections of the respective cells of the neural network shown in FIG. 14 are determined. In this embodiment, small random values are added to coordinates (64,64) of the center positions of the face patterns presented to the neural network, and the sums thus obtained are used as the initial values Q(0).

During the first learning operation, the information representing the feature points of the rightward-directed face pattern 50 is presented to the neural network. As described above, the degrees of matching with the feature points of the rightward-directed face pattern 50 are calculated for all of the cells of the neural network, and a cell, with which the feature points of the rightward-directed face pattern 50 best match, is found. This process is represented by Formula (32).

$$f_c = \beta \left[ \sum_{ij} \|(x_i - y_j) - (m_i - m_j)\| \right] + (1 - \beta) \left[ \sum_i \|x_i - m_i\| \right] \quad (32)$$

wherein fc represents the degree of best matching, x represents the vector of the position coordinates of the fundamental pattern, m represents the vector of the weight of connection of the cell, t represents the discrete time, and β represents a factor satisfying the conditions $0 \leq \beta \leq 1$.

In this embodiment, the degree of matching is a value for rating the degree of similarity of the positional relationship (topological relationship) between the eight position coordinates of the rightward-directed face pattern 50 and the positional relationship between the eight coordinates, which the cell has learned as the weight of connection.

Figure 16:
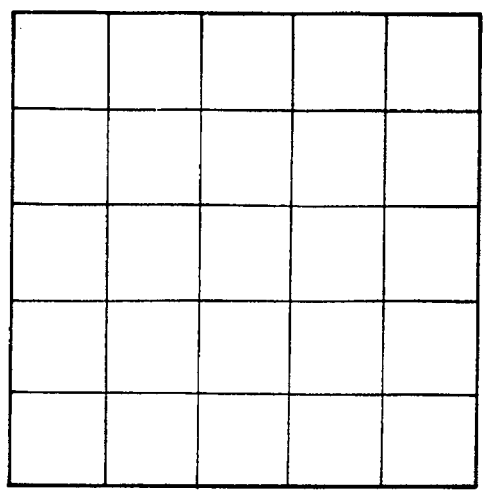
FIG. 16 is an explanatory view showing a neighboring region utilized in the second embodiment of the pattern learning method in accordance with the present invention.

In cases where it has been found from the calculations that the sets of the position coordinates of the feature points of the rightward-directed face pattern 50 best match with a cell (5,5), the neural network employed in this embodiment carries out its learning operation for the cells, which fall within a neighboring region Nc having its center at the cell (5,5). As illustrated in FIG. 16, in this embodiment, the neighboring region Nc has a 5×5 quadrangular shape. In this embodiment, the size of the neighboring region Nc is represented in terms of the length nc of one side of the quadrangle as shown below.

$$nc = 5 \quad (33)$$

Specifically, the learning operation is carried out for the cells falling within the 5×5 quadrangle having its center at the cell (5,5). How the learning operation is carried out for a cell (3,3) will be described hereinbelow. The pattern learning method in accordance with the present invention is different from the conventional Kohonen's self-organization in that the patterns used during the learning operation (i.e., the updating of the weight) are created with spatial interpolating operations in the manner described below. Specifically, as in the first embodiment of the pattern learning method in accordance with the present invention, during the learning operation for the cell (3,3), (a) fundamental patterns are selected which best match the cells falling within a region, which has a radius R and has its center at the cell (3,3), (b) learning patterns are created by carrying out spatial interpolating operations from all of the selected fundamental patterns [the proportions of interpolation are calculated from the relationship between the position of the cell, the weight of which is to be updated, i.e., the cell (3,3) in this case, and the positions of the cells, with which the selected fundamental patterns best match], and (c) the patterns obtained from the spatial interpolating operations are utilized during the learning operation of the cell (3.3).

Ordinarily, the range on which the spatial interpolating operations are carried out is set to be larger than the neighboring region Nc. In this embodiment, as in the first embodiment of the pattern learning method in accordance with the present invention, the radius R is determined with the formula $$R = nc/2 + 1 \quad (5')$$

Figure 17:
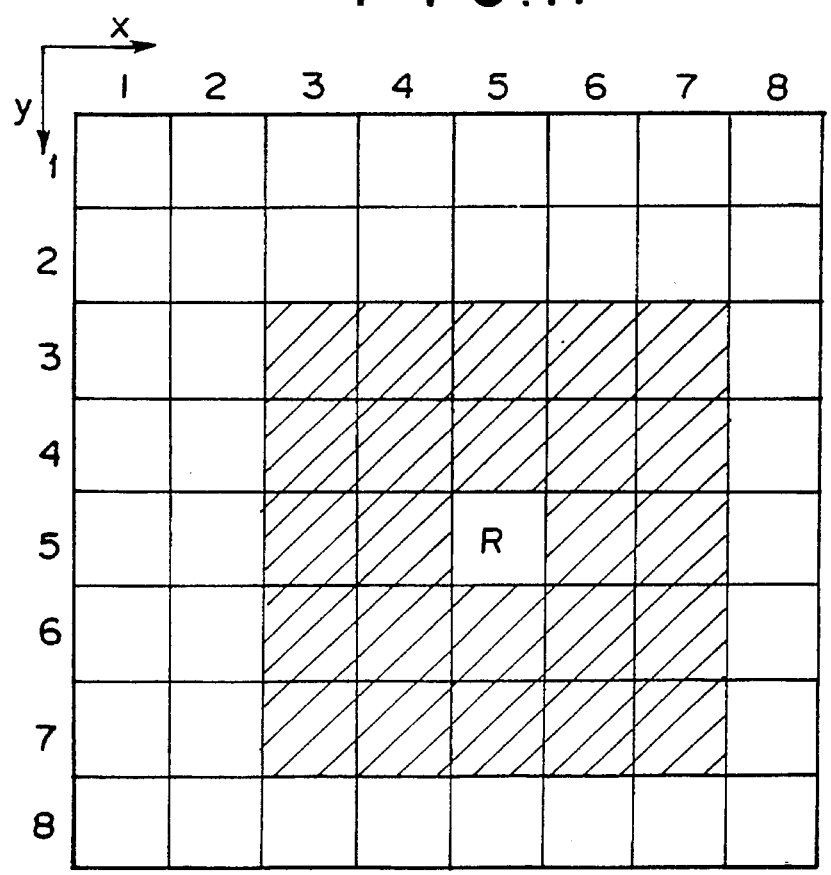
FIG. 17 is an explanatory view showing the state in which a rightward-directed face pattern is best matched with a cell during a first learning operation.

In this case, the feature points of the rightward-directed face pattern 50 are the feature points of the fundamental pattern first presented to the neural network. Therefore, of the cells falling within the region, which has the radius R and has its center at the cell (3,3), no cell best matches with the feature points of the fundamental patterns (i.e., the sets of the position coordinates of the feature points of the front-directed face pattern 51, the leftward-directed face pattern 52, the upward-directed face pattern 53, and the downward-directed face pattern 54) other than the pattern having been presented to the neural network. Therefore, in this case, spatial interpolating operations are carried out only with the feature points of the rightward-directed face pattern 50. Specifically, the sets of the position coordinates of the feature points of the rightward-directed face pattern 50 themselves are learned. This learning also applies to the learning operation of the other neighboring cells. Accordingly, as illustrated in FIG. 17, the cells (hatched in FIG. 17) falling within the neighboring region Nc having its center at the cell (5,5), with which the sets of the position coordinates of the feature points of the rightward-directed face pattern 50 best match, learn the feature points of the rightward-directed face pattern 50. In FIG. 17, as an aid in facilitating the explanation, the feature points of the rightward-directed face pattern 50 are indicated as "R." As in the first embodiment of the pattern learning method in accordance with the present invention, in general, this learning process is represented by the formula $$m_i(t+1) = m_i(t) + \alpha(t) \{x_i'(t) - m_i(t)\} \text{ for } i \in Nc$$
$$m_i(t+1) = m_i(t) \text{ otherwise} \quad (6')$$

wherein Nc represents the neighboring region having a range with a predetermined size and having its center at the cell, with which the fundamental pattern having been presented to the neural network best matches, α(t) represents the learning factor, and xi'(t) represents the position coordinates of the new feature points obtained from the spatial interpolating operations.

In the conventional Kohonen's self-organization, the neighboring region Nc in Formula (6') is reduced with the passage of time. On the other hand, in this embodiment, as in the first embodiment of the pattern learning method in accordance with the present invention, the neighboring region Nc in Formula (6'is kept constant regardless of the passage of time. Also, the learning factor α(t) is decreased with the passage of time and is set such that $$\alpha(t)=0.003-0.000001t \quad 0 \leq t \leq 1500$$

$$\alpha(t)=0.0015 \text{ otherwise} \qquad (34)$$

wherein t represents the number of calculations.

Therefore, xi'(t)=B50 for all of the cells (m,n) hatched in FIG. 17, and the learning operation is carried out such that $$Q(1)_{m,n}=Q(0)_{m,n}+\alpha(1) \times [B_{50}-Q(0)_{m,n}] \qquad (35)$$

wherein Q(t)m,n represents the value of the weight vector in the cell (m,n).

The information representing the feature points of the front-directed face pattern 51 is then presented to the neural network. As in the case of the feature points of the rightward-directed face pattern 50, the feature points of the front-directed face pattern 51 best match with the cell (5,5). Therefore, the learning operation is carried out on the cells falling with the neighboring region having its center at the cell (5,5). For example, as for the cell (3,3), the fundamental patterns utilized during the spatial interpolating operations include the feature points of the front-directed face pattern 51, which have been most recently presented to the neural network, and the feature points of the rightward-directed face pattern 50, which serve as the feature points of the other fundamental pattern, the feature points of both patterns best matching with the cell (5,5) falling within the region, which has the radius R and has its center at the cell (3,3). Specifically, the spatial interpolating operations will be carried out from the sets of the position coordinates of the feature points of the rightward-directed face pattern 50 and the sets of the position coordinates of the feature points of the front-directed face pattern 51.

However, in this case, a plurality of fundamental patterns, i.e., the feature points of the rightward-directed face pattern 50 and the feature points of the front-directed face pattern 51, best match the same cell (5,5), and such fundamental patterns include the feature points of the front-directed face pattern 51 which have most recently been presented to the neural network. In such cases, a rule is employed such that feature points of a fundamental pattern are not used during the spatial interpolating operations, which feature points best match with the same cell as the cell (5,5) best matching with the feature points of the fundamental pattern having most recently been presented to the neural network and which feature points are those of the fundamental pattern different from the fundamental pattern having most recently been presented to the neural network. Therefore, in this case, only the feature points of the front-directed face pattern 51 are selected as the feature points of the fundamental pattern to be used during the spatial interpolating operations. This rule is employed such that feature points of a plurality of fundamental patterns may not match with a single cell (i.e., such that the ordering may effected). Specifically, the cell (3,3) learns the sets of the position coordinates of the feature points of the front-directed face pattern 51. This learning also applies to the learning operation of the other neighboring cells. Accordingly, as illustrated in FIG. 18, in the cells (hatched in FIG. 18) falling within the neighboring region Nc having its center at the cell (5,5), the learning operation is carried out in accordance with the formula $$Q'(1)_{m,n}=Q(1)_{m,n}+\alpha(1) \times [B_{51}-Q(1)_{m,n}] \qquad (36)$$

Figure 18:
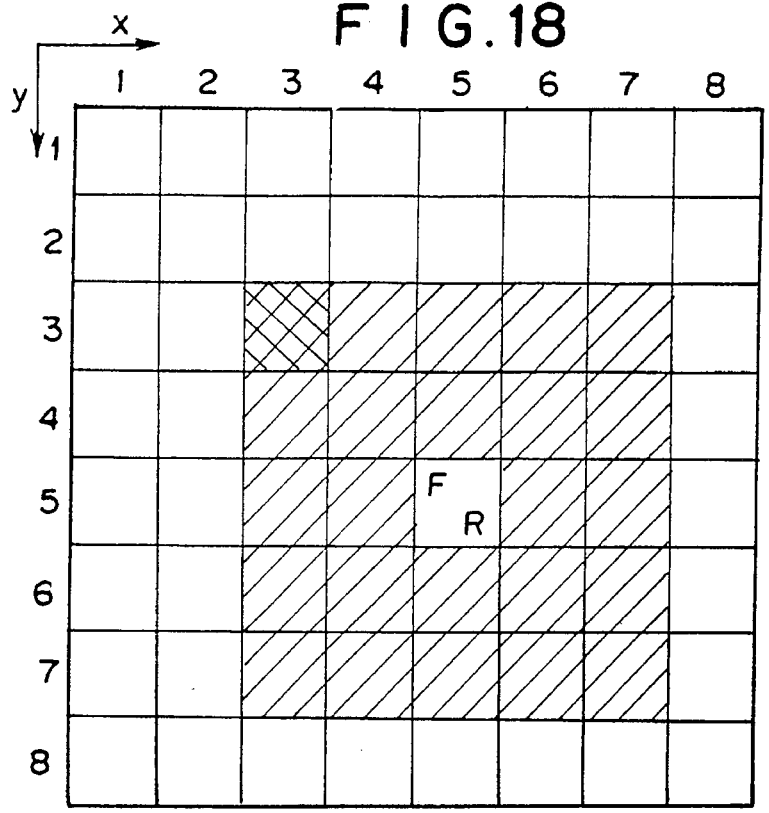
FIG. 18 is an explanatory view showing the state in which a front-directed face pattern is best matched with a cell during the first learning operation.

FIG. 18 illustrates the state in which the sets of the position coordinates of the feature points of the front-directed face pattern 51 and the sets of the position coordinates of the feature points of the rightward-directed face pattern 50 simultaneously best match with the cell (5,5). In FIG. 18, as an aid in facilitating the explanation, the feature points of the front-directed face pattern 51 are indicated as "F."

Thereafter, the information representing the feature points of the leftward-directed face pattern 52 is presented to the neural network. As in the cases of the feature points of the rightward-directed face pattern 50 and the feature points of the front-directed face pattern 51, the feature points of the leftward-directed face pattern 52 best match with the cell (5,5). In this case, the same rule is applied as in the case where the information representing the feature points of the front-directed face pattern 51 was presented to the neural network, and therefore the feature points of the rightward-directed face pattern 50 and the feature points of the front-directed face pattern 51 are not used during the spatial interpolating operations. Therefore, the feature points of the leftward-directed face pattern 52 themselves remain, and the cells falling within the neighboring region Nc having its center at the cell (5,5) carry out the learning operation in accordance with the formula $$Q''(1)_{m,n}=Q'(1)_{m,n}+\alpha(1) \times [B_{52}-Q'(1)_{m,n}] \qquad (37)$$

Figure 19:
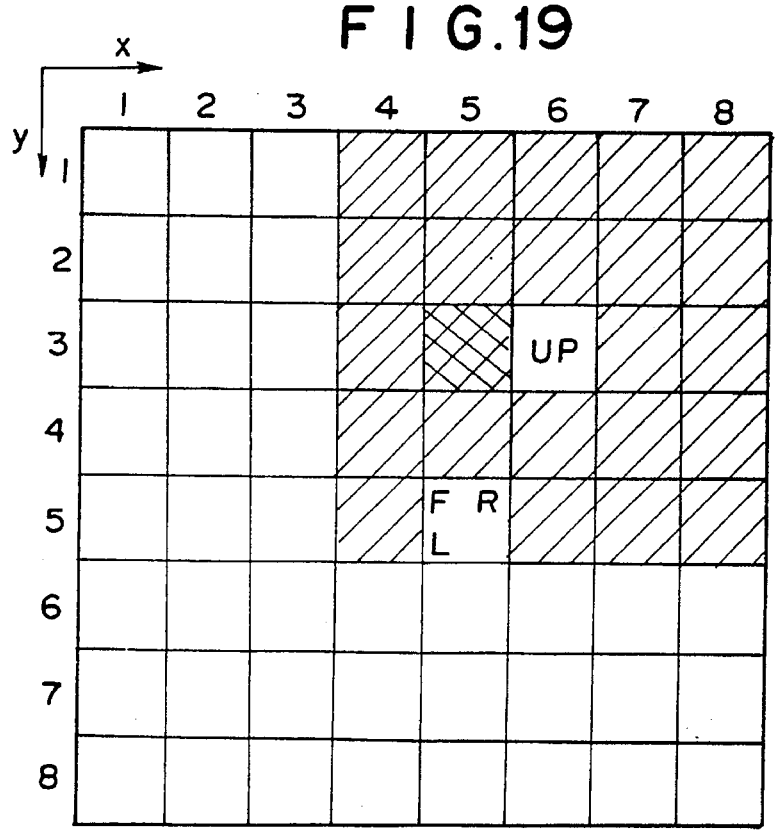
FIG. 19 is an explanatory view showing the state in which an upward-directed face pattern is best matched with a cell during an 11th learning operation.

Thereafter, the information representing the feature points of the upward-directed face pattern 53 is presented to the neural network. In this case, the sets of the position coordinates of the feature points of the upward-directed face pattern 53 best match with a cell (6,3). Also, as described above, the sets of the position coordinates of the feature points of the other fundamental patterns, i.e., the rightward-directed face pattern 50, the front-directed face pattern 51, and the leftward-directed face pattern 52, best match with the cells (5,5). Therefore, as illustrated in FIG. 19, the learning operation of the cells falling within a neighboring region Nc having its center at the cell (6,3) is carried out. For example, during the learning operation of a cell (5,3), the fundamental patterns best matching in the position coordinates with the cells falling within a region, which has a radius R and has its center at the cell (5,3), include the upward-directed face pattern 53 best matching with the cell (6,3), the rightward-directed face pattern 50 best matching with the cell (5,5), the front-directed face pattern 51 best matching with the cell (5,5), and the leftward-directed face pattern 52 best matching with the cell (5,5). Therefore, the sets of the position coordinates of the feature points of these fundamental patterns are selected as those to be used during the spatial interpolating operations for the cell (5,3).

How the spatial interpolating operations are carried out will hereinbelow be described in detail.

The distance da between the cell (6,3), with which the sets of the position coordinates of the feature points of the fundamental pattern most recently presented to the neural network, i.e., the upward-directed face pattern 53, best match, and the cell (5,3) is represented by the formula $$d_a = \sqrt{(6-5)^2 + (3-3)^2} \tag{38}$$

The distance db between the cell (5,5), with which the feature points of the rightward-directed face pattern 50 best match, and the cell (5,3) is represented by the formula $$d_b = \sqrt{(5-5)^2 + (5-3)^2} \tag{39}$$

The distance dc between the cell (5,5), with which the feature points of the front-directed face pattern 51 best match, and the cell (5,3) is represented by the formula $$d_c = \sqrt{(5-5)^2 + (5-3)^2} \tag{40}$$

The distance dd between the cell (5,5), with which the feature points of the leftward-directed face pattern 52 best match, and the cell (5,3) is represented by the formula $$d_d = \sqrt{(5-5)^2 + (5-3)^2} \tag{41}$$

Figure 20:
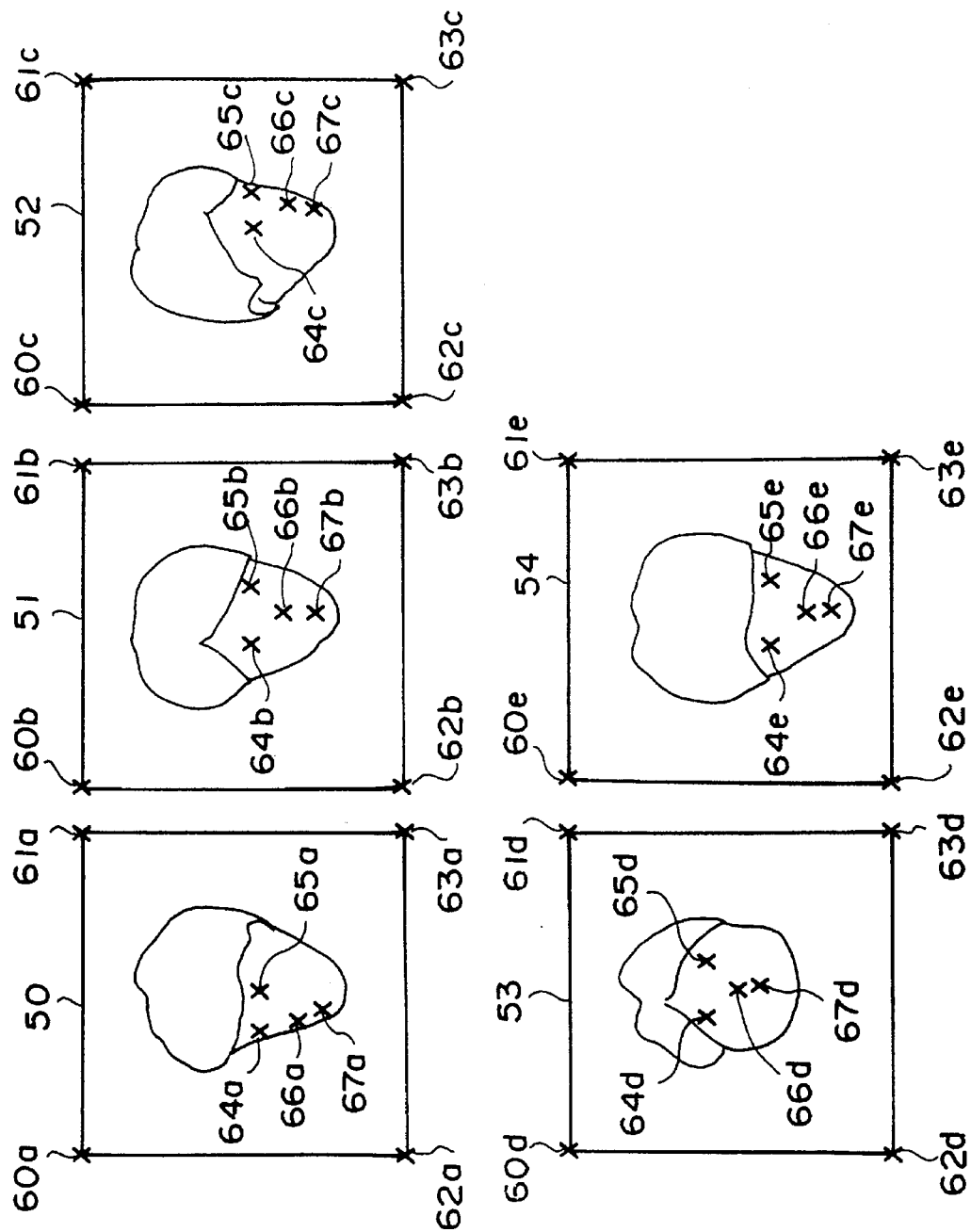
FIG. 20 is an explanatory view showing feature points of fundamental patterns employed during spatial interpolating operations.

Also, as illustrated in FIG. 20, feature points 60a through 67a of the rightward-directed face pattern 50, feature points 60b through 67b of the front-directed face pattern 51, feature points 60c through 67c of the leftward-directed face pattern 52, feature points 60d through 67d of the upward-directed face pattern 53, and the feature points 60e through 67e of the downward-directed face pattern 54 are set. The position coordinates of these feature points on the images are determined for use during the spatial interpolating operations.

In cases where the feature points 64a, 64b, 64c, 64d, and 64e respectively have coordinates (xa1,ya1), (xb1,yb1), (xc1,yc1), (xd1,yd1), and (xe1,ye1), position coordinates of new feature points on images, which are created by the spatial interpolating operations, can be calculated from degrees of dependence (P), which are calculated from the distances obtained from Formulas (38), (39), (40), and (41). The calculation of the position coordinates of the new feature points can be carried out with the formulas shown below.

When $d_a \neq 0$, $$P(a) = \frac{1/(d_a + s(a))}{1/(d_a + s(a)) + 1/(d_b + s(b)) + 1/(d_c + s(c)) + 1/(d_d + s(d))} \tag{42}$$

$$P(b) = \frac{1/(d_b + s(b))}{1/(d_a + s(a)) + 1/(d_b + s(b)) + 1/(d_c + s(c)) + 1/(d_d + s(d))}$$

$$P(c) = \frac{1/(d_c + s(c))}{1/(d_a + s(a)) + 1/(d_b + s(b)) + 1/(d_c + s(c)) + 1/(d_d + s(d))}$$

$$P(d) = \frac{1/(d_d + s(d))}{1/(d_a + s(a)) + 1/(d_b + s(b)) + 1/(d_c + s(c)) + 1/(d_d + s(d))}$$

In Formula (42), s(a), s(b), s(c), and s(d) are the constants for effecting the ordering and can be represented as follows:

$$s(a) = \begin{cases} 0 & (d_a \neq 0) \\ \text{constant} & (d_a = 0) \end{cases} \tag{44}$$

$$s(b) = \begin{cases} 0 & (d_b \neq 0) \\ \text{constant} & (d_b = 0) \end{cases}$$

$$s(c) = \begin{cases} 0 & (d_c \neq 0) \\ \text{constant} & (d_c = 0) \end{cases}$$

$$s(d) = \begin{cases} 0 & (d_d \neq 0) \\ \text{constant} & (d_d = 0) \end{cases}$$

From the degrees of dependence P(a), P(b), P(c), and P(d), which have been calculated from Formulas (42) and (43), the new position coordinates (x1',y1') are calculated with the formulas $$x_1' = x_{a1} \times P(a) \times x_{b1} \times P(b) + x_{c1} \times P(c) + x_{d1} \times P(d) \tag{45}$$

$$y_1' = y_{a1} \times P(a) \times y_{b1} \times P(b) + y_{c1} \times P(c) + y_{d1} \times P(d) \tag{46}$$

When the processing described above is carried out for all of the feature points 60a through 67a, 60b through 67b, 60c through 67c, and 60d through 67d, the new position coordinates can be determined.

In the embodiment described above, the spatial interpolating operations are carried out from the position coordinates of the feature points of the rightward-directed face pattern 50, the front-directed face pattern 51, the leftward-directed face pattern 52, and the upward-directed face pattern 53. In general, new position coordinates are obtained in the manner described below.

Of the fundamental patterns presented to the neural network, the fundamental patterns, which best match in the position coordinates with the cells located within the circle having the radius R and having its center at the cell subjected to the updating of the weight of connection, and which have been selected for use in the spatial interpolating operations, are represented as (1, 2, ..., N). As in the first embodiment of the pattern learning method in accordance with the present invention, if the fundamental pattern having been fed most recently into the neural network is represented by m, the degrees of dependence to be used during the calculations of the new position coordinates can be calculated with the formula shown below.

When $d(m) \neq 0$, $$P(i) = \frac{1/(d(i) + s(i))}{\sum_{j=1}^{N} 1/(d(j) + s(j))} \tag{22'}$$

wherein $$s(j) = \begin{cases} 0 & (d(j) \neq 0) \\ \text{constant} & (d(j) = 0, j \neq m) \end{cases} \tag{23'}$$

and d(i) represents the distance between the cell, the weight of which is to be updated, and the cell, with which the position coordinates of the i'th fundamental pattern best match.

When $d(m)=0$, $P(m)=1$ $P(i)=0$ (i=1, 2, ... N, i≠m) \hfill (24')

Therefore, if certain position coordinates of a feature point i of the fundamental pattern selected for the spatial interpolating operations are represented by (x(i),y(i)), new position coordinates (x',y') can be calculated with the formulas $$x' = \sum_{j=1}^{N} x(i) \times P(i) \tag{25'}$$

$$y' = \sum_{j=1}^{N} y(i) \times P(i) \tag{26'}$$

A set R1 of the position coordinates is created from the spatial interpolating operations in the manner described above, and the learning operation with respect to the weight of connection of the cell (5,3) is carried out with Formula (47) by using the set R1. In this embodiment, the ordering constant s(j) is set as follows:

$$s(j) = \begin{cases} 0 \, (d(j) \neq 0) \\ \sqrt{2} \, (d(j) \neq 0, j \neq m) \end{cases} \tag{30'}$$

Thereafter, the learning operation of the other neighboring cells is carried out in the same manner as that described above. Also, the information representing the downward-directed face pattern 54 is presented to the neural network, and the learning operation is carried out in the same manner as that described above. In this manner, the first learning operation is completed.

Figures 21, 22:
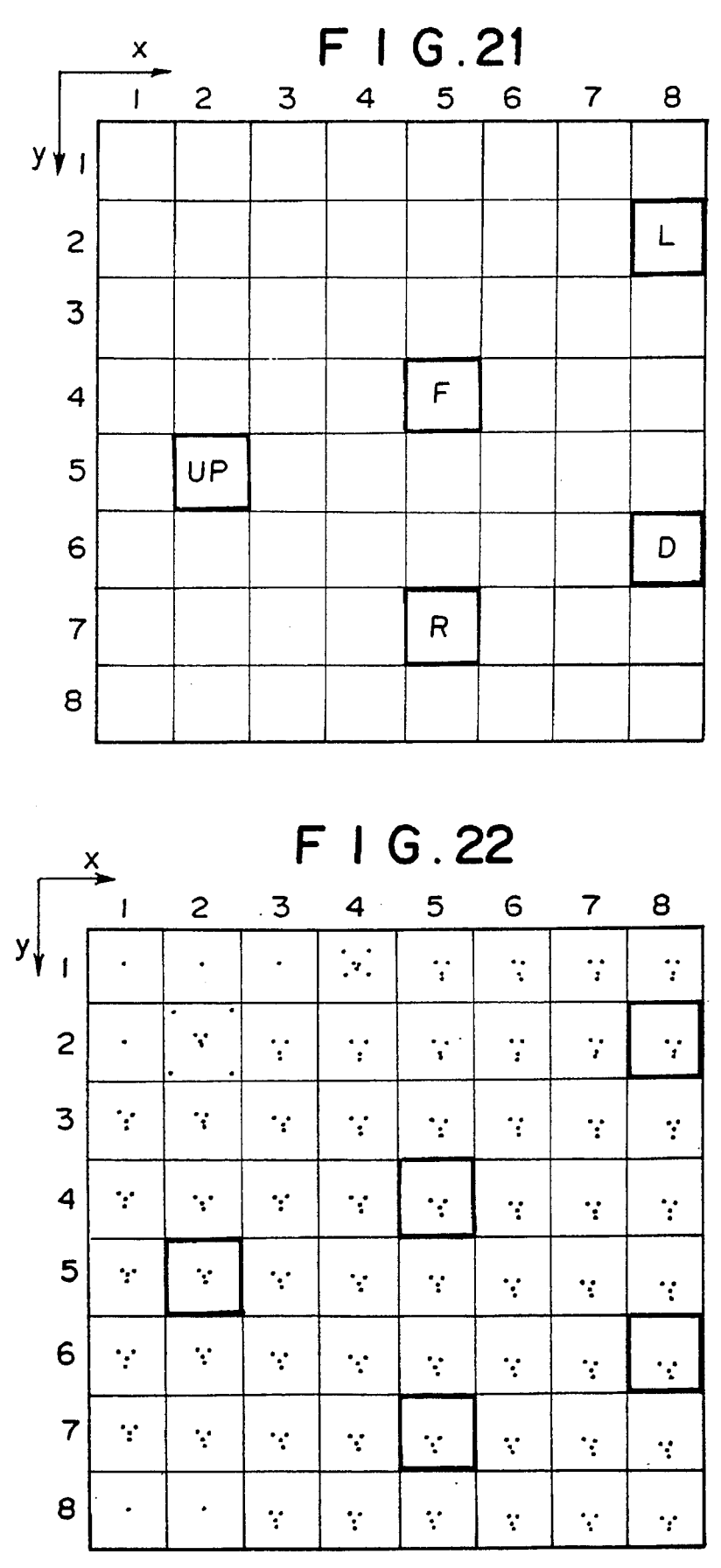

When the learning operation described above is carried out repeatedly, the ordering of the feature points of the fundamental patterns presented to the neural network progresses. In this embodiment, as illustrated in FIG. 21, at the time at which 3,500 times of learning operations have been carried out, the cell, with which the sets of the position coordinates of the feature points of the rightward-directed face pattern 50 best match, shifts to the cell (5,7). The front-directed face pattern 51 best matches with a cell (5,4), and the leftward-directed face pattern 52 "L" best matches with a cell (8,2). Also, the upward-directed face pattern 53 best matches with a cell (2,5), and the downward-directed face pattern 54 "D" best matches with a cell (8,6). The relationship between the positions of the cells, with which these fundamental patterns best match, reflects (keeps) the relationship between the positions of the rightward-directed face pattern 50, the front-directed face pattern 51, the leftward-directed face pattern 52, the upward-directed face pattern 53, and the downward-directed face pattern 54. Also, the cells located between the cells, with which the fundamental patterns best match, have learned the sets of position coordinates spatially interpolated in accordance with the positional relationship with respect to the cells, with which the sets of the position coordinates of the feature points of the fundamental patterns best match.

In the state shown in FIG. 21, the learning operations of the neural network are approximately completed. FIG. 22 shows the distribution of the cells and the results of the plotting of the sets of the position coordinates, which the respective cells have learned, at the coordinates (0,0) through (127,127).

Figure 23:
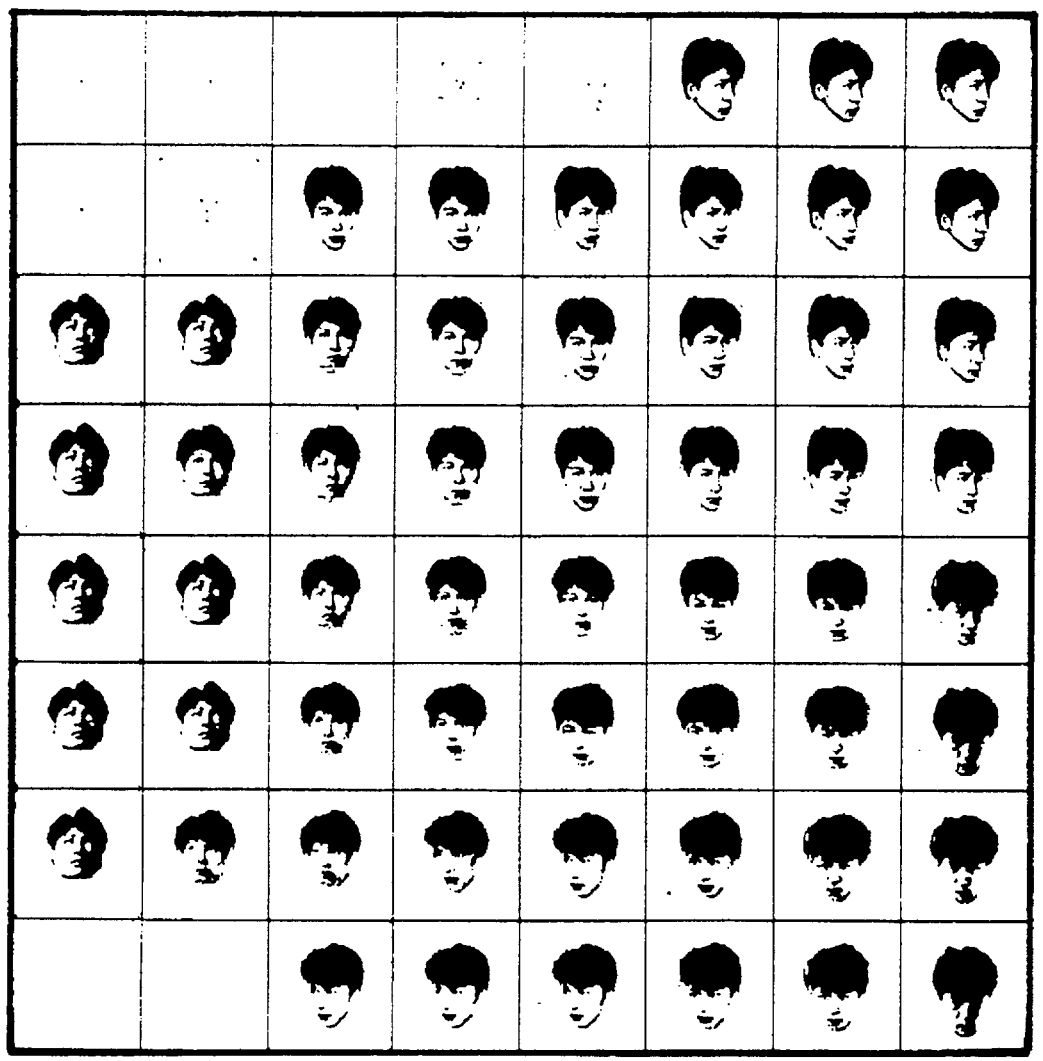
FIG. 23 is an explanatory view showing the state obtained from operations for interpolating density values of interpolated patterns in accordance with the results of the learning with respect to the feature points.
Figure 24:
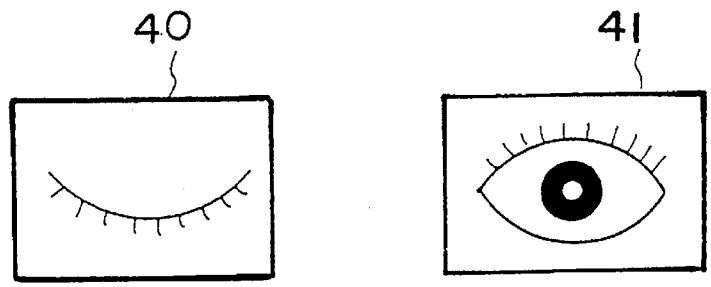
FIG. 24 is a schematic view showing an open eye pattern and a closed eye pattern.
Figure 25:
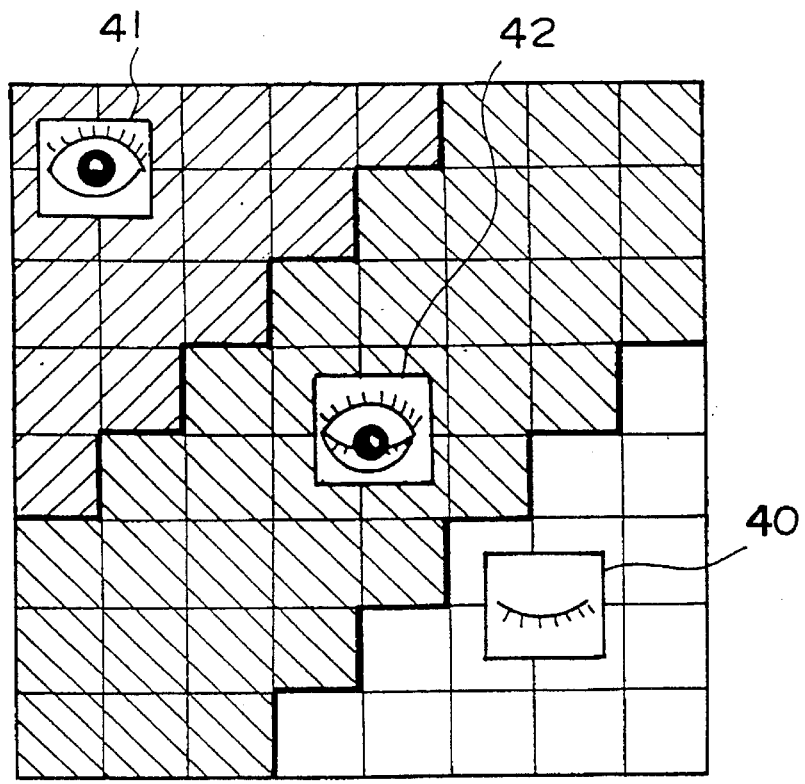
FIG. 25 is an explanatory view showing the state obtained from the mapping with a Kohonen's self-organization.

Thereafter, as illustrated in FIG. 23, in accordance with the positions, at which the face patterns serving as the fundamental patterns are finally mapped, density values spatially interpolated from the density values of the respective face images can be allocated to the corresponding face images. The allocation of the density values may be carried out with the same procedure as that in the spatial interpolating operations for the density values carried out in the first embodiment of the pattern learning method in accordance with the present invention.

The results of the learning operations may be utilized to build up a discrimination system using the architecture of the neocognitron. In this manner, a discrimination system can be built up which can cope with a change in the angle of a face and is unaffected by a shift in position of a pattern.

With the second embodiment wherein the learning operations of the neural network are carried out by using only the information representing the feature points of the fundamental patterns, the number of pieces of information presented to the neural network can be kept smaller than in the first embodiment of the pattern learning method in accordance with the present invention wherein the learning operations are carried out with the pieces of information representing the feature points and the density values of the fundamental patterns. Therefore, with the second embodiment of the pattern learning method in accordance with the present invention, the calculation time required before the learning operations are completed can be kept short.

In the second embodiment described above, the pieces of information representing five kinds of the fundamental patterns are presented to the neural network, and the neural network has 64 cells in the 8×8 quadrangle. However, no limitation is imposed on the number of the fundamental patterns presented to the neural network and the number of the cells of the neural network. Also, the cells may have a circular shape. Additionally, the arrangement of the cells is not limited to the two-dimensional arrangement and may be of other dimensions.

Also, in the second embodiment described above, the position coordinates of the feature points are used which are of two-dimensional coordinate values. The position coordinates are not limited to two-dimensional coordinates and may be of three-dimensional coordinate values representing the structures of face patterns in three dimensions.

Additionally, in the aforesaid second embodiment, in accordance with the shape of the cells of the neural network, the neighboring region Nc is set so as to have the 5×5 quadrangular shape. The shape of the neighboring region Nc is not limited to the quadrangle. The neighboring region Nc may have a circular shape or any of other shapes. The arrangement of the neighboring region Nc is not limited to the two-dimensional arrangement and may be of other dimensions.

Further, in the second embodiment described above, the circular region having the radius R is employed as the region, from which the fundamental patterns to be used during the spatial interpolating operations are selected. Alternatively, the shape of the region, from which the fundamental patterns to be used during the spatial interpolating operations are selected (and which is slightly larger than the neighboring region Nc), may be changed in accordance with a change in the shape of the neighboring region Nc.

In the first and second embodiments described above, random values are employed as the initial values for the weights of connections of the cells. Alternatively, in cases where the number of the fundamental patterns presented to the neural network is small and their order is clear to the human eyes, the pieces of information representing the fundamental patterns may be fed manually into the neural network, and the allocation of the input images may thereby be carried out. Thereafter, the results thus obtained may be utilized as the initial values for the weights of connections of the cells. As another alternative, the results of the mapping with the conventional Kohonen's self-organization may be utilized as the initial values for the weights of connections of the cells.

Also, the spatial interpolating operations are not limited to those employed in the first and second embodiments described above, and any of other methods, e.g., the method utilized in computer graphics, may be employed for this purpose.

Additionally, the constants, such as α(t) and s(j), are not limited to those used in the first and second embodiments described above. Appropriate values may be selected in accordance with the input of the fundamental patterns utilized during the learning operations.

What is claimed is:

1. A pattern learning method comprising the steps of:

presenting information signals representing a plurality of different find mental patterns of varying image density representative of physical objects to a large number of cells of a neural network;

assigning a spatial position for each of the cells;

causing a chosen cell, which best matches with a first fundamental pattern having been presented to the neural network, to learn said first fundamental pattern;

for neighboring cells having a distance within a predetermined range from the chosen cell, carrying out orientation-based spatial interpolating operations, using respective ones of said spatial positions, between the first fundamental pattern and a second fundamental pattern which has been learned by a second cell, the second fundamental pattern not being the first fundamental pattern and the second cell not being the chosen cell; and causing said neighboring cells to learn the results of said spatial interpolating operations, thereby causing the cells to learn a large number of feature patterns.

2. A pattern learning method comprising the steps of (i) presenting information signals representing a plurality of different fundamental patterns of varying image density representative of physical objects to a large number of cells of a neural network, each said cell having a weight of connection for storing information representing a respective learning pattern, (ii) assigning a spatial position for each of the cells, (iii) presenting initial weight of connection information having small random values to the neural network, said weight of connection information being defined as information representing a single fundamental pattern among the plurality of the fundamental patterns, and said predetermined values representing initial values of weights of connections of the large number of the cells, (iv) for each neighboring cell, each neighboring cell being one of those ones of the cells within a first predetermined range from a chosen cell, the chosen cell being that one of the cells which best matches with the single fundamental pattern;

selecting from among the plurality of the fundamental patterns, selected fundamental patterns that best match with a second set of cells by comparison of the weight of connection of the second set of cells with the fundamental patterns, the second set of cells being those of the cells that have a distance within a second predetermined range from the neighboring cell, and the second predetermined range being larger than the first predetermined range;

carrying out spatial interpolating operations, using respective ones of said spatial positions, between the respective fundamental patterns in accordance with the relationship between (a) each of the positions of the cells with which the selected fundamental patterns best match, and (b) the position of the neighboring cell; and therefor carrying out learning of the weight of connection of the neighboring cell in accordance with interpolated patterns that have been obtained from the spatial interpolating operations, said learning of the weight of connection being a process in which the weight of connection is changed so as to gradually approximate the interpolated patterns, (v) carrying out the learning of the weight of connection for all of the plurality of the fundamental patterns, and (vi) iterating the learning of the weight of connection for all of the plurality of the fundamental patterns until the large number of the cells finish their learning operations, thereby causing the cells to learn a large number of feature patterns.

3. A method as defined in claim 2 wherein none of said selected fundamental patterns other than said single fundamental pattern best match with said chosen cell.

4. A method as defined in claim 3 wherein, in the neural network, results of the learning with a Kohonen's self-organization with respect to the plurality of the fundamental patterns are utilized as said initial values of the weights of connections of the large number of the cells.

5. A method as defined in claim 4 wherein information representing a plurality of feature points, which are common to the plurality of the fundamental patterns, is presented to the neural network for each of said fundamental patterns, and said learning of the weight of connection of said neighboring cell is carried out in accordance with interpolated patterns, which have been obtained from spatial interpolating operations with respect to said feature points.

6. A method as recited in claim 5 wherein said information signals and said fundamental patterns are representative of images of said physical objects.

7. A method as recited in claim 4 wherein said information signals and said fundamental patterns are representative of images of said physical objects.

8. A method as defined in claim 3 wherein, in the neural network, results obtained from manual presentation of the plurality of the fundamental patterns are utilized as said initial values of the weights of connections of the large number of the cells.

9. A method as defined in claim 8 wherein information representing a plurality of feature points, which are common to the plurality of the fundamental patterns is presented to the neural network for each of said fundamental patterns, and said learning of the weight of connection of said neighboring cell is carried out in accordance with interpolated patterns, which have been obtained from spatial interpolating operations with respect to said feature points.

10. A method as recited in claim 9 wherein said information signals and said fundamental patterns are representative of images of said physical objects.

11. A method as recited in claim 8 wherein:

information representing at least one of (a) a plurality of feature points that are common to the plurality of the fundamental patterns, and (b) information representing density values of respective picture elements in each of said fundamental patterns, are presented to the neural network for each of said fundamental patterns, the feature points being points representing loci within the plurality of the fundamental patterns at which common features of the plurality of the fundamental patterns at located; and said learning of the weight of connection of said each neighboring cell is carried out in accordance with interpolated patterns, which have been obtained from said spatial interpolating operations with respect to said feature points and said density values.

12. A method as recited in claim 11 wherein said information signals and said fundamental patterns are representative of images of said physical objects.

13. A method as recited in claim 8 wherein said information signals and said fundamental patterns are representative of images of said physical objects.

14. A method as defined in claim 3 wherein information representing a plurality of feature points, which are common to the plurality of the fundamental patterns, is presented to the neural network for each of said fundamental patterns, and said learning of the weight of connection of said neighboring cell is carried out in accordance with interpolated patterns, which have been obtained from spatial interpolating operations with respect to said feature points.

15. A method as recited in claim 14 wherein aid information signals and said fundamental patterns are representative of images of said physical objects.

16. A method as recited in claim 4 wherein:

information representing at least one of (a) a plurality of feature points that are common to the plurality of the fundamental patterns, and (b) information representing density values of respective picture elements in each of said fundamental patterns, are presented to the neural network for each of said fundamental patterns, the feature points being points representing loci within the plurality of the fundamental patterns at which common features of the plurality of the fundamental patterns at located; and said learning of the weight of connection of said each neighboring cell is carried out in accordance with interpolated patterns, which have been obtained from said spatial interpolating operations with respect to said feature points and said density values.

17. A method as recited in claim 16 wherein said information signals and said fundamental patterns are representative of images of said physical objects.

18. A method as recited in claim 3 wherein:

information representing at least one of (a) a plurality of feature points that are common to the plurality of the fundamental patterns, and (b) information representing density values of respective picture elements in each of said fundamental patterns, are presented to the neural network for each of said fundamental patterns, the feature points being points representing loci within the plurality of the fundamental patterns at which common features of the plurality of the fundamental patterns at located; and said learning of the weight of connection of said each neighboring cell is carried out in accordance with interpolated patterns, which have been obtained from said spatial interpolating operations with respect to said feature points and said density values.

19. A method as recited in claim 18 wherein said information signals and said fundamental patterns are representative of images of said physical objects.

20. A method as recited in claim 3 wherein said information signals and said fundamental patterns are representative of images of said physical objects.

21. A method as defined in claim 2 wherein, in the neural network, results of said learning, using a Kohonen's self-organization with respect to the plurality of the fundamental patterns, are utilized as said initial values of the weights of connections of the large number of the cells.

22. A method as defined in claim 21 wherein information representing a plurality of feature points, which are common to the plurality of the fundamental patterns, is presented to the neural network for each of said fundamental patterns, and said learning of the weight of connection of said neighboring cell is carried out in accordance with interpolated patterns, which have been obtained from spatial interpolating operations with respect to said feature points.

23. A method as recited in claim 22 wherein said information signals and said fundamental patterns are representative of images of said physical objects.

24. A method as recited in claim 21 wherein:

information representing at least one of (a) a plurality of feature points that are common to the plurality of the fundamental patterns, and (b) information representing density values of respective picture elements in each of said fundamental patterns, are presented to the neural network for each of said fundamental patterns, the feature points being points representing loci within the plurality of the fundamental patterns at which common features of the plurality of the fundamental patterns at located; and said learning of the weight of connection of said each neighboring cell is carried out in accordance with interpolated patterns, which have been obtained from said spatial interpolating operations with respect to said feature points and said density values.

25. A method as recited in claim 24 wherein said information signals and said fundamental patterns are representative of images of said physical objects.

26. A method as recited in claim 21 wherein said information signals and said fundamental patterns are representative of images of said physical objects.

27. A method as defined in claim 2 wherein, in the neural network, results obtained from manual presentation of the plurality of the fundamental patterns are utilized as said initial values of the weights of connections of the large number of the cells.

28. A method as recited in claim 27 wherein:

information representing at least one of (a) a plurality of feature points that are common to the plurality of the fundamental patterns, and (b) information representing density values of respective picture elements in each of said fundamental patterns, are presented to the neural network for each of said fundamental patterns, the feature points being points representing loci within the plurality of the fundamental patterns at which common features of the plurality of the fundamental patterns at located; and said learning of the weight of connection of said each neighboring cell is carried out in accordance with interpolated patterns, which have been obtained from said spatial interpolating operations with respect to said feature points and said density values.

29. A method as recited in claim 28 wherein said information signals and said fundamental patterns are representative of images of said physical objects.

30. A method as recited in claim 27 wherein said information signals and said fundamental patterns are representative of images of said physical objects.

31. A method as defined in claim 27 wherein information representing a plurality of feature points, which are common to the plurality of the fundamental patterns, is presented to the neural network for each of said fundamental patterns, and said learning of the weight of connection of said neighboring cell is carried out in accordance with interpolated patterns, which have been obtained from spatial interpolating operations with respect to said feature points.

32. A method as recited in claim 31 wherein said information signals and said fundamental patterns are representative of images of said physical objects.

33. A method as defined in claim 2 wherein:

said information presented to the neural network for each of said fundamental patterns includes information representing a plurality of feature points that are common to the plurality of the fundamental patterns.

34. A method as defined in claim 33 wherein after said learning for all of the plurality of the fundamental patterns has been iterated until the large number of the cells finish their learning operations, density values of respective picture elements in each of said interpolated patterns are spatially interpolated and allocated to the large number of the cells in accordance with the results of said learning.

35. A method as recited in claim 34 wherein said information signals and said fundamental patterns are representative of images of said physical objects.

36. A method as recited in claim 33 wherein said information signals and said fundamental patterns are representative of images of said physical objects.

37. A method as recited in claim 2 wherein:

information representing at least one of (a) a plurality of feature points that are common to the plurality of the fundamental patterns, and (b) information representing density values of respective picture elements in each of said fundamental patterns, are presented to the neural network for each of said fundamental patterns, the feature points being points representing loci within the plurality of the fundamental patterns at which common features of the plurality of the fundamental patterns at located; and said learning of the weight of connection of said each neighboring cell is carried out in accordance with interpolated patterns, which have been obtained from said spatial interpolating operations with respect to said feature points and said density values.

38. A method as recited in claim 37 wherein said information signals and said fundamental patterns are representative of images of said physical objects.

39. A method as recited in claim 2 wherein said information signals and said fundamental patterns are representative of images of said physical objects.

* * * * *